United States Patent
Li et al.

(10) Patent No.: US 9,907,085 B2
(45) Date of Patent: Feb. 27, 2018

(54) WIFI-COORDINATED LAA-LTE

(71) Applicant: Avago Technologies General IP (Singapore) Pte. Ltd., Singapore (SG)

(72) Inventors: Yong Li, San Diego, CA (US); Guy Drory, Givaataim (IL); Yonatan Cohen, Ramat Gan (IL); Baoguo Yang, Saratoga, CA (US); Matthew Fischer, Mountain View, CA (US); Sharon Levy, Binyamina (IL); Sindhu Verma, Bangalore (IN); Shubhodeep Adhikari, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 105 days.

(21) Appl. No.: 14/862,838

(22) Filed: Sep. 23, 2015

(65) Prior Publication Data

US 2016/0095110 A1 Mar. 31, 2016

Related U.S. Application Data

(60) Provisional application No. 62/056,157, filed on Sep. 26, 2014, provisional application No. 62/074,505, filed on Nov. 3, 2014.

(30) Foreign Application Priority Data

Nov. 1, 2014 (IN) ............................ 5479/CHE/2014

(51) Int. Cl.
*H04W 72/12* (2009.01)
*H04W 88/10* (2009.01)
*H04W 74/08* (2009.01)

(52) U.S. Cl.
CPC .... *H04W 72/1215* (2013.01); *H04W 74/0816* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 2013/0078924 A1* | 3/2013 | Choudhury | H04W 16/14 455/62 |
| 2014/0029527 A1* | 1/2014 | Okuda | H04W 72/085 370/329 |

(Continued)

OTHER PUBLICATIONS

Vassis et al., The IEEE 802.11g Standard for High Data Rate WLANs, IEEE Network, May/Jun. 2005, 6 pages.

(Continued)

*Primary Examiner* — Chi H Pham
*Assistant Examiner* — Vladislav Agureyev
(74) *Attorney, Agent, or Firm* — Foley & Lardner LLP

(57) ABSTRACT

A method includes detecting, using a WiFi access point, channel use data indicating traffic on a plurality of channels of an unlicensed LTE band in a wireless network. The method further includes providing the channel use data to a Long Term Evolution (LTE) access point. The method further includes selecting, using the LTE access point, a channel for use in transmitting data by the LTE access point from among the plurality of channels based on the channel use data from the WiFi access point. The method further includes providing, from the LTE access point, an indication of an upcoming transmission configured to transmit data on the channel to the WiFi access point. The method further includes broadcasting one or more messages from the WiFi access point to one or more WiFi nodes, the one or more messages configured to prevent the WiFi nodes from transmitting on the channel.

20 Claims, 28 Drawing Sheets

(56) References Cited

U.S. PATENT DOCUMENTS

| | | | | |
|---|---|---|---|---|
| 2014/0092765 A1* | 4/2014 | Agarwal | H04W 24/02 | 370/252 |
| 2014/0213256 A1* | 7/2014 | Meylan | H04W 36/22 | 455/436 |
| 2015/0063148 A1* | 3/2015 | Sadek | H04L 1/20 | 370/252 |
| 2015/0110066 A1* | 4/2015 | Gaal | H04W 72/0453 | 370/330 |
| 2015/0133057 A1* | 5/2015 | Yavuz | H04W 72/02 | 455/63.3 |
| 2015/0180676 A1* | 6/2015 | Bao | H04L 12/1886 | 370/230 |
| 2015/0223075 A1* | 8/2015 | Bashar | H04W 16/14 | 370/329 |
| 2015/0296508 A1* | 10/2015 | Fan | H04W 72/0446 | 370/329 |
| 2015/0334744 A1* | 11/2015 | Ji | H04W 74/0816 | 370/336 |
| 2015/0351079 A1* | 12/2015 | Himayat | H04W 28/08 | 370/329 |
| 2015/0351115 A1* | 12/2015 | Jeon | H04W 48/16 | 455/450 |
| 2015/0382374 A1* | 12/2015 | Bhorkar | H04W 24/00 | 370/330 |
| 2016/0007378 A1* | 1/2016 | Bertorelle | H04W 74/006 | 370/329 |
| 2016/0066204 A1* | 3/2016 | Khawer | H04W 72/085 | 455/500 |
| 2016/0066306 A1* | 3/2016 | Khawer | H04W 72/0446 | 370/329 |
| 2016/0088631 A1* | 3/2016 | Hedayat | H04W 16/14 | 370/329 |
| 2016/0095009 A1* | 3/2016 | Ling et al. | H04W 16/14 | 370/329 |
| 2016/0119846 A1* | 4/2016 | Chou | H04W 36/22 | 370/331 |
| 2016/0234706 A1* | 8/2016 | Liu | H04L 27/2662 | |
| 2016/0277956 A1* | 9/2016 | Lindheimer | H04W 36/22 | |
| 2016/0309491 A1* | 10/2016 | Dai | H04W 72/04 | |

OTHER PUBLICATIONS

Wikipedia, Network Allocation Vector, as available online on Oct. 14, 2014 at https://en.wikipedia.org/wiki/Network_allocation_vector, retrieved from internet archives on Jul. 14, 2016, 1 page as printed.

* cited by examiner

WIFI-COORDINATED LAA-LTE

CROSS-REFERENCE TO RELATED APPLICATIONS

The present applications claims priority to U.S. Provisional Patent Application No. 62/056,157, filed Sep. 26, 2014, Indian Provisional Patent Application No. 5479/CHE/2014, filed Nov. 1, 2014, and U.S. Provisional Patent Application No. 62/074,505, filed Nov. 3, 2014, all of which are incorporated by reference herein in their entireties.

FIELD

The present disclosure relates generally to the field of networking, including, but not limited to, the coordination of Long-Term Evolution (LTE) with WiFi and access points.

BACKGROUND

LTE is a standard for wireless communication. LAA-LTE (Licensed Assisted Access-LTE, also called LTE-LAA, LAA, LTE-U, LTE Unlicensed or unlicensed LTE) generally makes use of an unlicensed spectrum (i.e., a spectrum not reserved for a particular company, network, etc.) in a wireless network. It is difficult to operate (e.g., transmit and receive messages) in the unlicensed spectrum as interference in the unlicensed band can occur.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, a framework for a small cell design that integrates a LAA-LTE access point and one or more WiFi access points are shown and described. Small cells are low-powered nodes that operate in various ranges. The small cells of the present disclosure are designed to operate at least in part in the unlicensed spectrum (e.g., a spectrum not reserved for a particular company, network, etc.).

LAA-LTE (or LTE-U) is a standard for wireless communication that makes use of the unlicensed spectrum. In various embodiments of the present disclosure, an LAA-LTE access point and one or more WiFi access points are integrated to improve the use of the unlicensed spectrum (e.g., to avoid interference).

In some embodiments, the small cell design is configured to support concurrent dual-band WiFi access points (e.g., dual-band 802.11n and 802.11ac). In some embodiments, the small cell design is further configured to adhere to a listen-before-talk protocol, allowing the LAA-LTE access point to achieve the same level of fairness (i.e., not using a channel already used) as a WiFi access point, and further allowing multiple LAA-LTE access points to coexist with one another. In some embodiments, one of the WiFi access points is used as a coordinator for LAA-LTE access point transmissions (i.e., the WiFi access point is used to identify and select a channel for transmissions on behalf of the LAA-LTE access point). In various embodiments, the small cell design provides solutions relating to channel media access procedures for the LAA-LTE access point, through the WiFi access points. In some embodiments, the access points are integrated and simple new functionality is provided to each access point to support the activities of the present disclosure.

Figure 1:
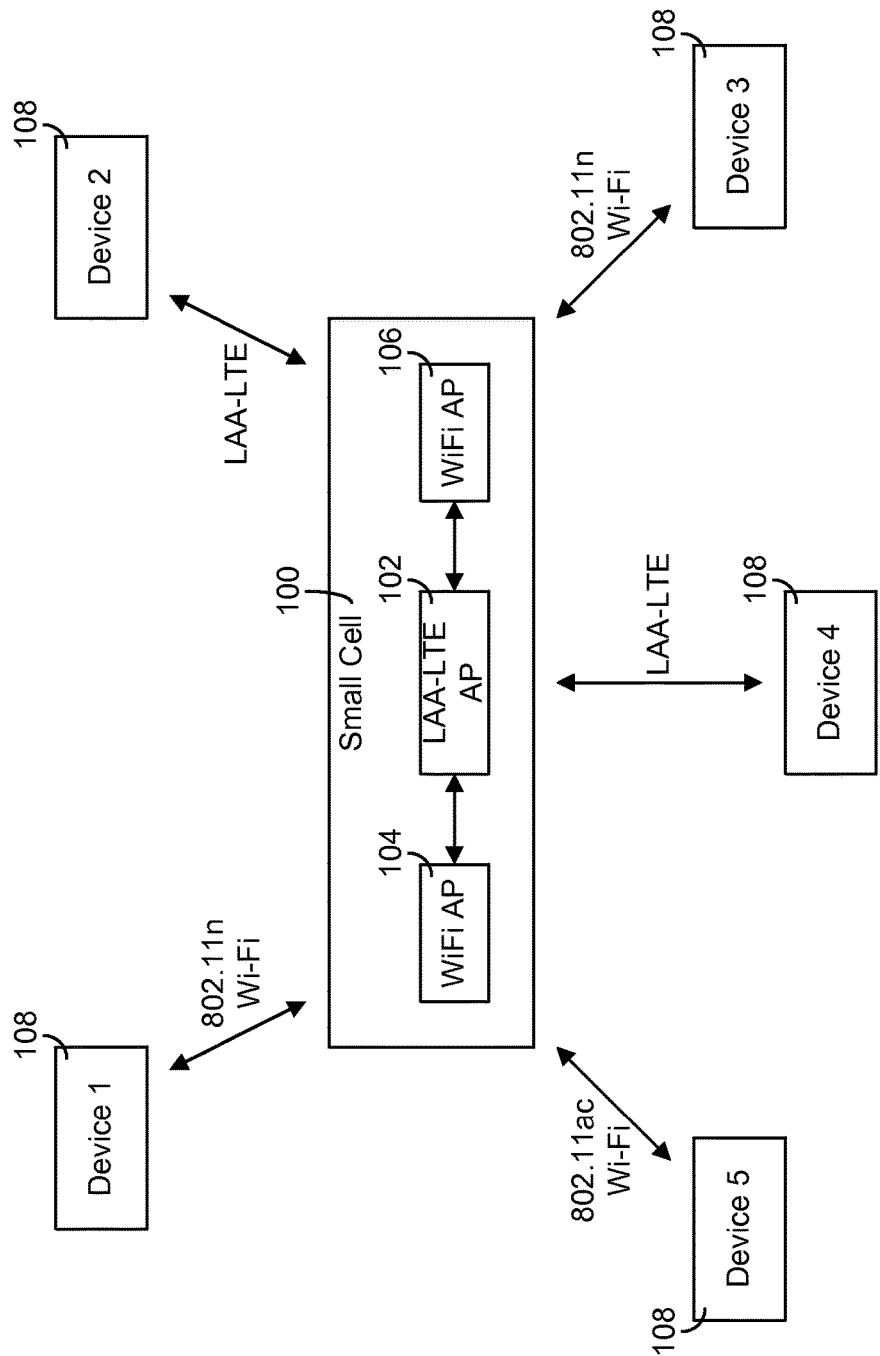
FIG. 1 is a block diagram of an environment including a small cell with WiFi and Licensed Assisted Access-Long-Term Evolution (LAA-LTE) capability and a plurality of devices in communication with the small cell.
Figure 2:
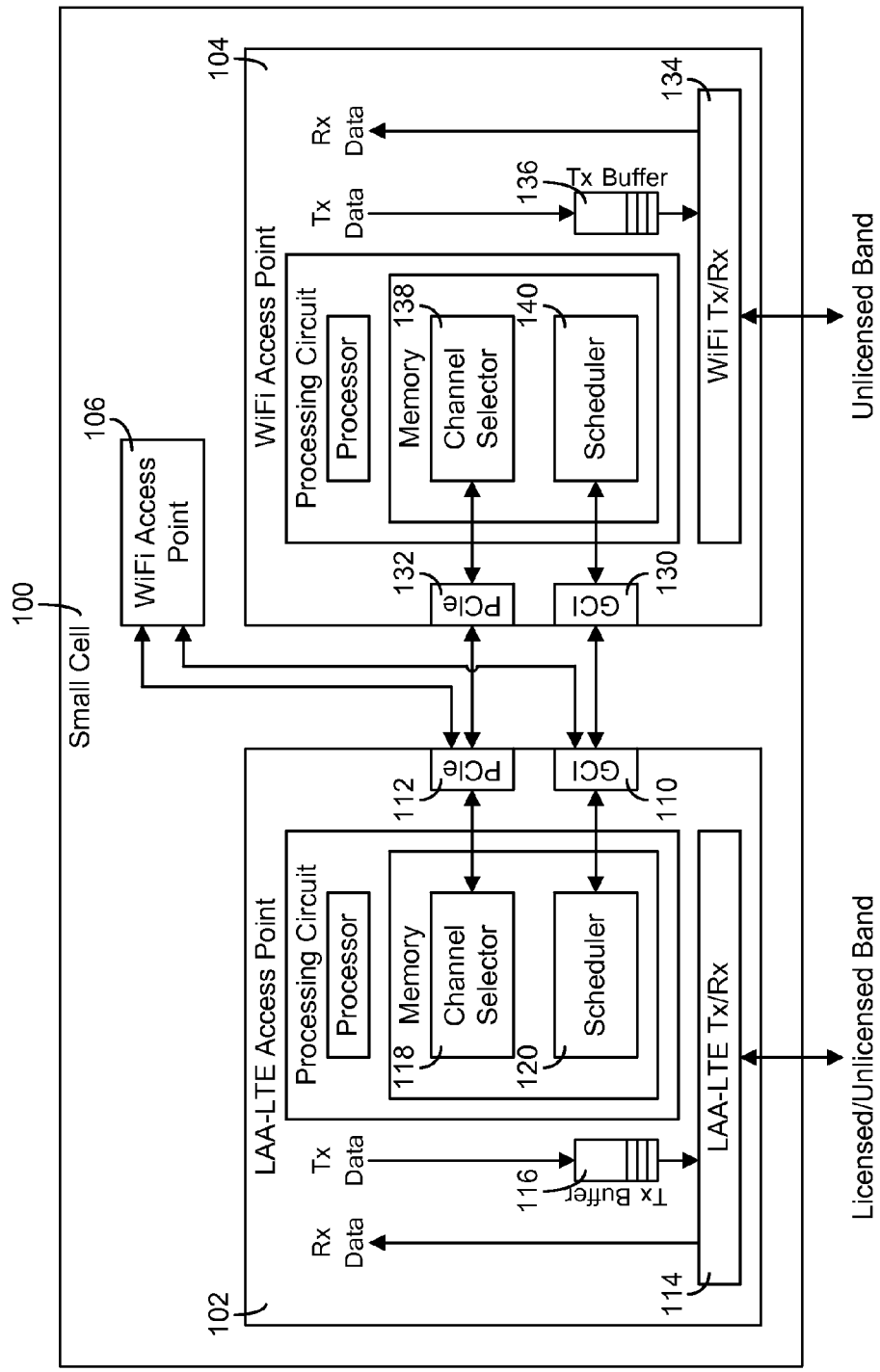
FIG. 2 is a more detailed block diagram of the small cell design of FIG. 1 according to an exemplary embodiment.

Referring to FIGS. 1-2, block diagrams of a small cell 100 design is shown, according to exemplary embodiments. As shown in FIG. 1, a LAA-LTE access point 102 is communicably coupled to a pair of WiFi access points 104, 106. While in the present disclosure a small cell 100 is described with a LAA-LTE access point and two WiFi access points, in other embodiments, various other configurations of small cell 100 are possible. For example, small cell 100 may include a pair of LAA-LTE access points and a WiFi access point.

Referring further to FIG. 1, small cell 100 is shown in communication with a plurality of devices 108. Small cell 100 is implementable in an environment such as an office, commercial or residential building, school, or any other type of environment in which devices connect wirelessly. Small cell 100 is configured to communicate with the various devices 108 by providing a network incorporating a variety of standards. For example, some devices 108 are shown communicating to small cell 100 via LAA-LTE, other devices 108 are shown communicating to small cell 100 via 802.11n WiFi, and yet other devices 108 are shown communicating to small cell 100 via 802.11ac WiFi. It should be understood that the present disclosure can be adapted to accommodate a plurality of communication protocols for a plurality of devices and small cell 100.

Referring more specifically to FIG. 2, an example embodiment of small cell 100 is shown (only one WiFi access point 104 is shown in detail for space considerations; in some embodiments, WiFi access point 106 includes the same or similar components as WiFi access point 104).

LAA-LTE access point 102 is coupled to WiFi access point 104 via a UART-based general circuit interface (GCI) 110, 130 and a peripheral component interconnect express (PCIe) interface 112, 132. GCI interface 110, 130 is configured to carry real-time critical signals and messages, and PCIe interface 112, 132 is configured to carry non-real-time communications between the access points. Each access point is shown to generally include a transmitter/receiver circuit 114, 134 for transmitting and receiving data, and a buffer 116, 136 for receiving data. LAA-LTE access point 102 further includes a channel selector 118 and scheduler 120, and WiFi access point 104 further include a channel selector 138 and scheduler 140. The activities of the channel selectors and schedulers are described in greater detail in subsequent figures.

Access points 102, 104 are further shown to include a processing circuit including a processor and memory. The memories are shown to include the channel selector and scheduler. In some embodiments, the memories further include other modules for controlling the activities of their respective access points. In some embodiments, the processors are, or include, one or more microprocessors, application specific integrated circuits (ASICs), circuits containing one or more processing components, a group of distributed processing components, circuitry for supporting a microprocessor, or other hardware configured for processing. The processors are configured to execute computer code stored in memory to complete and facilitate the activities described herein. The memories are any volatile or non-volatile computer-readable storage medium capable of storing data or computer code relating to the activities described herein. For example, the memories are shown to include modules which are computer code modules (e.g., executable code, object code, source code, script code, machine code, etc.) configured for execution by the processor. According to some embodiments, the processing circuits may represent a collection of processing devices (e.g., servers, data centers, etc.). In such cases, the processors represent the collective processors of the devices and the memories represent the collective storage devices of the devices. When executed by the processors, the processing circuits are configured to complete the activities described herein. In some embodiments, channel selectors 118, 138 and/or schedulers 120, 140 may be implemented outside of the memory (e.g., using hardware-based circuitry).

The present disclosure describes the use of a WiFi access point as the WiFi coordinator. For example, WiFi access point 104 may be the WiFi coordinator. In the present disclosure, WiFi access point 104 and WiFi coordinator are interchangeably used. Further, in the present disclosure, small cell 100 may be referred to as the WiFi coordinator although small cell 100 has other components. Even though the present disclosure describes the use of a WiFi access point as the WiFi Coordinator, this is just one of the implementation options. In other embodiments, all or some functions of the WiFi Coordinator are integrated with the LAA-LTE access point. In this case, the interface between the LAA-LTE access point and the WiFi coordinator (an integrated functional module) is an internal one. The signals and messages proposed in the present disclosure for the external interfaces (e.g., interfaces 110, 112, 130, 132) are adapted for the internal interface in such embodiments. Some such integrated embodiments provide low latency and flexibility and can be deployed without requiring an on-board WiFi access point.

Figure 3:
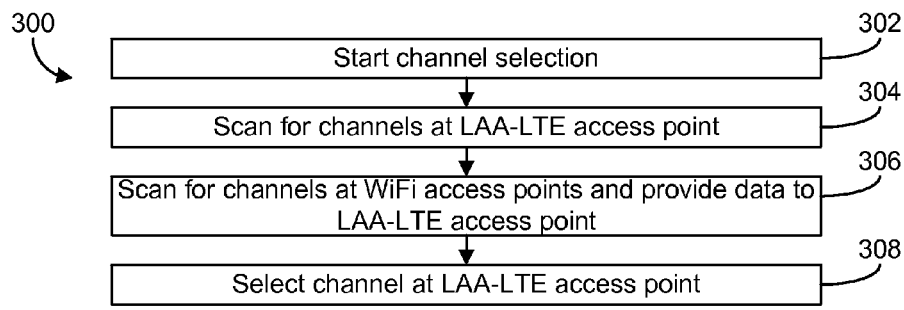
FIG. 3 is a flow diagram of a process for coordinated channel selection of the small cell according to an exemplary embodiment.
Figure 4:
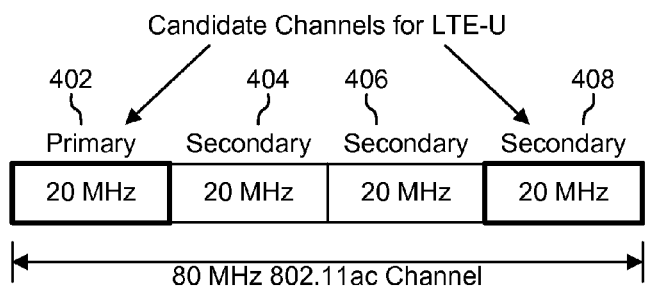
FIG. 4 illustrates a LAA-LTE access point channel selection according to an exemplary embodiment.
Figure 5:
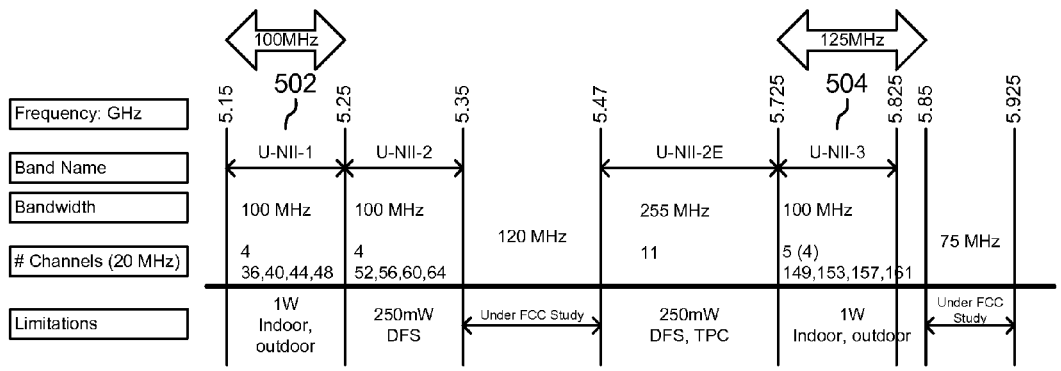
FIG. 5 illustrates a LAA-LTE access point channel selection with respect to sub-bands available for selection according to an exemplary embodiment.

Referring generally to FIGS. 3-5, channel selection for LAA-LTE access point 102 is described in greater detail.

The activities described in FIGS. 3-5 may be supported by, for example, channel selector 118 or 138 shown in FIG. 2. FIG. 3 illustrates a flow 300 for channel selection.

Appropriate channel selection is used for coexistence between LAA-LTE and WiFi. When LAA-LTE and WiFi access points (access points hereinafter abbreviated "AP") operate on the same unlicensed band (e.g. 5 GHz), the APs could cause co-channel interference and data collisions if the same set of channels are occupied. A particular WiFi AP may be able to scan for neighboring WiFi APs and select a channel that has no or minimal overlap with the other WiFi APs. However, the WiFi AP may not be able to reliably detect the neighboring LAA-LTE APs (without making changes to its hardware), since WiFi and LAA-LTE are designed to detect different transmission patterns (e.g., the WiFi short preamble), which may have, for example, different receive sensitivity and energy detection thresholds. Similarly, for the same reason, a particular LAA-LTE AP may be able to scan for (or be informed about) neighboring LAA-LTE APs and select a channel that has no or minimal overlap with other LAA-LTE APs, but it may not be able to reliably detect the neighboring WiFi APs (without making changes to its hardware).

To achieve better results for channel selection, the LAA-LTE and WiFi APs co-located in the same small cell communicate with one another (as described in FIG. 2) to exchange lists of detected channels, along with information such as channel IDs, received signal strength indication (RSSI), signal to noise interference ration (SNIR), etc. in some embodiments. Such complimentary information from the other co-locating APs allows an AP to develop a more complete picture of the current channel allocation and RF environment in some embodiments, thus enabling the AP to select a channel that has no or minimal overlap with not just its own system (WiFi or LAA-LTE), but also the other systems as well.

In some embodiments, as part of the WiFi AP's scanning operation, the AP parses each neighbor AP's beacon messages and finds out each neighbor AP's primary channel and secondary channels. Besides the information reported by a co-located WiFi AP, the LAA-LTE channel selection can also make use of other types of extended information (e.g., 802.11k) reported by the neighboring WiFi APs to a central controller, which in turn sends such extended information to the LAA-LTE small cell in some embodiments.

The channel selection is first performed during the initialization of the small cell. In some embodiments, during normal operation, the LAA-LTE AP and the WiFi APs in the small cell periodically exchange channel information, allowing each AP to perform appropriate adaptive channel changes. In some embodiments, the rate of adaptation is configured by a service operator (e.g., via a management protocol such as TR-069) to accommodate the specific dynamic nature of the RF environment at the location the APs are deployed. For instance, in some such embodiments, the rate of adaptation is configured to be once per ten minutes or once per hour. Alternatively, the adaptation is triggered by certain events that are occurring during normal operation. For instance, when a neighboring WiFi AP joins the existing WiFi or LAA-LTE channel of the small cell, the adaptation can be triggered in order to find a new channel for the small cell to minimize potential interference and data collision with the newly added neighboring WiFi AP.

In an environment where there are 5 GHz channels with no neighboring LAA-LTE or WiFi APs, the small cell selects separate channels for its WiFi AP and LAA-LTE AP, since the LAA-LTE AP does not use the protection and assistance from the WiFi AP for coexistence. In this case, in some embodiments, the LAA-LTE AP operates on a regular discontinuous transmission basis with a fixed high duty cycle, with the WiFi AP periodically switching to the channel used by the small cell to detect that this channel is still free of other WiFi APs. In some embodiments, if no such unoccupied channel exists and the LAA-LTE AP has to share with neighboring WiFi APs, then the small cell's own WiFi AP operates on the same channel as the LAA-LTE AP, so that the two APs perform coordinated data transmissions on the channel and achieve better coexistence with neighboring APs.

In some embodiments, the LAA-LTE and WiFi APs use the PCIe interfaces to exchange channel scanning and selection information, since such information is not real-time-critical.

Referring further to FIG. 3 and flow 300 of operations, the channel selection process is described. The channel selection process is started (operation 302). The start can be based on an initialization of the small cell, the introduction of a new WiFi AP in the same area as the small cell, or on a rate of adaptation (e.g., ten minutes, one hour) as described above. The LAA-LTE and WiFi APs scan for available channels (operations 304, 306) and channel use data is provided to the LAA-LTE AP (or another controller) (operation 306). The data is used to select a channel for communications (operation 308).

Via flow 300, a channel is selected for the LAA-LTE AP that does not interfere with other WiFi APs in some embodiments. In other words, the WiFi APs of the small cell "listen" on behalf of the LAA-LTE in order to select an appropriate channel. In some embodiments, the WiFi APs of the small cell are dedicated to just searching for an appropriate channel on the LAA-LTE AP's behalf; in other embodiments, the WiFi APs further provide WiFi services to one or more nodes (e.g., user equipment, or UE, nodes). In some embodiments, by having the WiFi APs search for channels, the LAA-LTE AP is dedicated to continuously transmitting data on the appropriate channels.

For example, assume that an existing neighboring WiFi AP occupying a 80 MHz channel is detected and a 20 MHz LAA-LTE channel (carrier) has to be selected among the four component 20 MHz channels of the neighboring WiFi AP. Each channel may have different features or benefits. As shown in FIG. 4, the selection is between the primary channel 402 and the rightmost secondary channel 408, as it may be determined that the two other secondary channels 404, 406 have no unique benefits. Selecting primary channel 402 has, for example, the benefit of allowing CTS-to-Nowhere messages (clear-to-send-to-nowhere, described below) to be decoded and the NAV (network allocation vector) values (which represent LAA-LTE Tx periods) in these messages to be extracted. Selecting secondary channel 408 has, for example, the benefit of achieving low probability of signal overlap between the LAA-LTE AP and any neighboring WiFi AP, since any 20 MHz, 40 MHz or 60 MHz WiFi bursts from the neighboring WiFi AP will not overlap with the LAA-LTE signal in the rightmost channel.

To avoid the complexity of supporting DFS (Dynamic Frequency Selection) and TPC (Transmit Power Control), the LAA-LTE supplemental downlink (SDL) channels can be selected to reside in the sub-bands that do not require DFS or TPC support by the regulatory bodies. For example, in the U.S., there are 225 MHz of the spectrum that are not required to support DFS or TPC by the FCC. FIG. 5 illustrates the portions of the spectrum not required to supports DFS or TPC, indicated by references 502, 504.

Referring generally to FIGS. 6-9, WiFi coordinated LAA-LTE data transmissions for the small cell are described in greater detail according to exemplary embodiments. On the MAC/PHY level of a network (the media access control and physical layer level), the coexistence of LAA-LTE and WiFi is improved if the transmissions of these two systems on a shared channel are coordinated in such a way that the collisions between them are reduced or minimized.

In some embodiments, a data transmission scheme for the LAA-LTE AP may be as follows. Before each SDL transmission period, the LAA-LTE AP sends an indication of its transmission to the co-located WiFi AP running on the same channel, using the GCI real-time interface. The indication includes information about the duration of the transmission period. Upon receiving this indication, the WiFi AP updates its NAV and at the same time sends a CTS message to nowhere (CTS2NW) on the shared channel, with the NAV value in the CTS2NW message being set to cover the entire region of the scheduled LAA-LTE transmission as well as any communication latencies. This is shown in greater detail in FIG. 6. The CTS2NW message may force all neighboring WiFi nodes on the shared channel to back off from the region of LAA-LTE transmission, thus mitigating or avoiding data collision between the LAA-LTE and WiFi APs.

Figure 6:
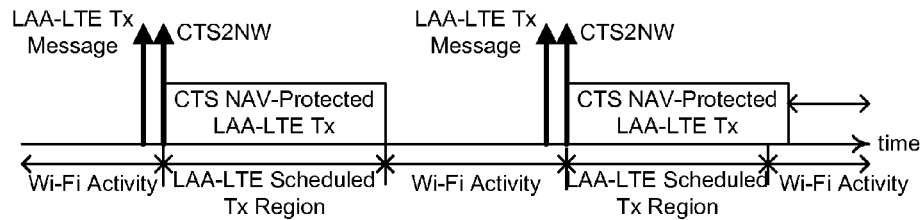
FIG. 6 illustrates a WiFi access point sending a clear-to-send (CTS) message in order to clear a shared channel for the LAA-LTE access point according to an exemplary embodiment.
Figure 7:
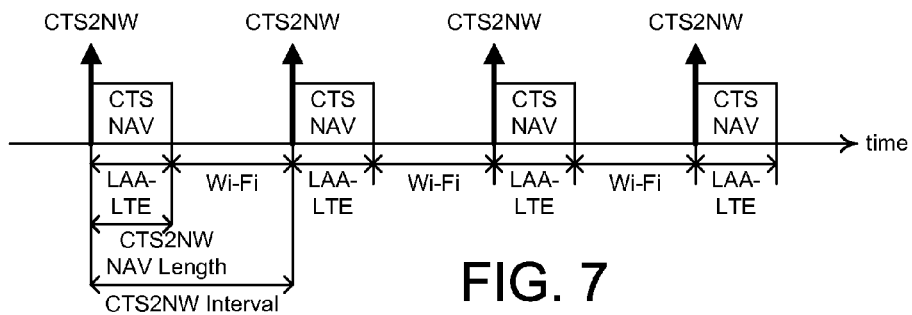
FIG. 7 illustrates a WiFi access point sending CTS messages on an interval according to an exemplary embodiment.

The process as described and shown in FIG. 6, in some embodiments, is extendable in various ways. For instance, if the LAA-LTE AP requires "guaranteed" regular transmissions (e.g., for video conferencing or video streaming), the LAA-LTE AP requests the WiFi AP to send out regular CTS2NW messages to clear out the traffic of all neighboring WiFi nodes (APs and clients) on the shared channel on behalf of the LAA-LTE AP, as shown in FIG. 7. In some embodiments, the CTS2NW messages are not sent out in exactly regular intervals, since the transmissions still have to follow required media access procedures (e.g., enhanced distributed channel access (EDCA) media access procedures); in this case, the LAA-LTE bursts are not exactly regular either and certain jitter can result for individual bursts.

Furthermore, in order to control the fairness of sharing the channel, in some embodiments, the small cell is configured by the service operator to adjust the CTS2NW NAV length (i.e. transmission duration) and the CTS2NW interval, maintaining a specific LAA-LTE duty cycle. This duty cycle can also be dynamically adjusted by the LAA-LTE AP scheduler on the basis of traffic activity on the channel. For instance, in some embodiments, if there is no WiFi activity on the channel, the duty cycle is enlarged to a configurable maximum value (e.g. 80%). Similarly, in some embodiments, if there is no LAA-LTE activity on the shared channel, the duty-cycle is reduced to a configurable minimum value (e.g. 10%) and the duty period is extended.

Figure 8:
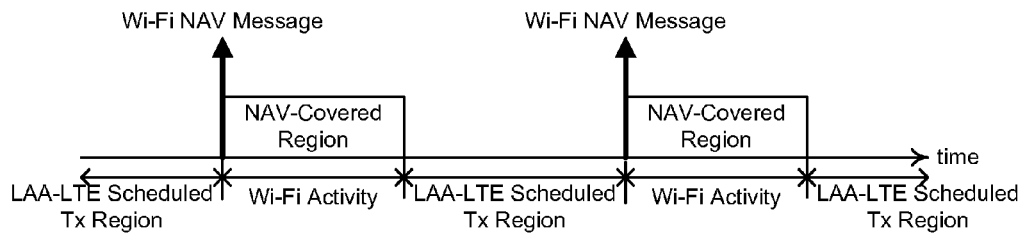
FIG. 8 illustrates a WiFi access point sending a network allocation vector (NAV) indication to a LAA-LTE access point in order for the latter to schedule LAA-LTE transmissions outside of the NAV time region according to an exemplary embodiment.

To provide real-time channel-activity information to the LAA-LTE scheduler, in some embodiments, the WiFi AP also sends the NAV information extracted from the shared channel to the LAA-LTE AP. In some such embodiments, the LAA-LTE AP tries to schedule its transmissions outside of the NAV-covered regions. Referring to FIG. 8, the scheduling of transmissions outside of the NAV-covered regions is shown in greater detail according to some embodiments.

For the convenience of description, the WiFi AP that assists the LAA-LTE AP with its SDL data transmissions is called the WiFi coordinator in the present disclosure (and labeled as 104). In some embodiments, the primary channel of the WiFi coordinator overlaps with the LAA-LTE AP SDL channel.

Figure 9:
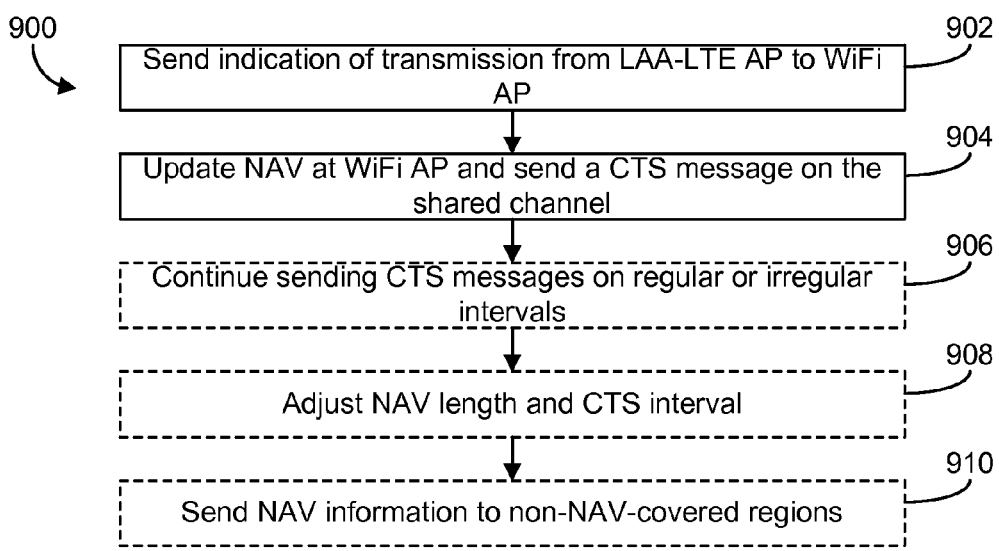
FIG. 9 is a flow diagram of a process for reserving a channel for LAA-LTE access point transmissions according to an exemplary embodiment.

Referring now to FIG. 9, a diagram of a flow 900 of operations for reserving a channel for LAA-LTE AP transmissions is summarized. Flow 900 includes sending an indication of a transmission from the LAA-LTE AP to the WiFi AP (operation 902). The indication includes information about the duration of the transmission to be transmitted. Flow 900 further includes, in response to the indication, updating the WiFi AP's NAV and sending a CTS message on the desired shared channel (operation 904). This ensures that neighboring WiFi APs on the shared channel do not use the channel, allowing the LAA-LTE AP to use the channel.

Flow 900 optionally includes continuing to send CTS messages on regular or irregular intervals (operation 906). For example, if the LAA-LTE AP wishes to guarantee regular transmissions, the WiFi APs indicates as such to the other nodes by transmitting further CTS messages. Flow 900 optionally includes adjusting the NAV length and CTS interval (operation 908). The adjustments help control the sharing of the channel between the smart cell and other nearby APs. For example, if there is no WiFi activity on the channel, the duty cycle is be increased, resulting in the smart cell more often reserving the channel for LAA-LTE activity. If there is no LAA-LTE activity on the channel, the duty cycle is reduced. Flow 900 optionally includes the WiFi AP's sending NAV information to the LAA-LTE access point (operation 910). This allows the LAA-LTE access point to schedule transmissions outside the NAV-covered time regions in some embodiments.

Figure 10:
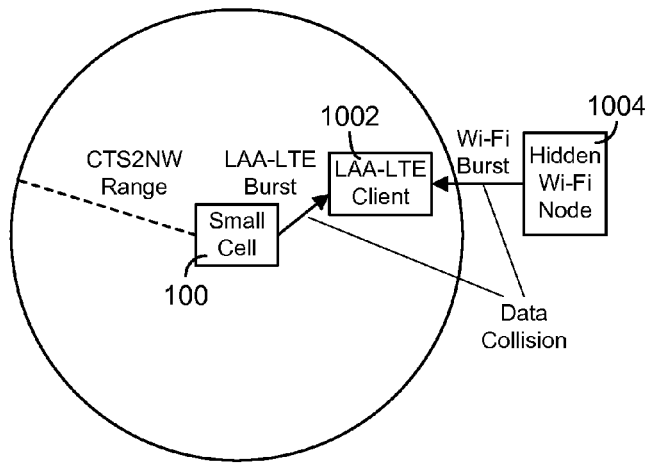
FIG. 10 illustrates a potential hidden WiFi node interference with a small cell transmission according to an exemplary embodiment.

The above mechanism described in FIGS. 6-9 relies on CTS2NW to clear the WiFi traffic in the channel. In some embodiments, the CTS2NW mechanism cannot clear WiFi traffic for hidden WiFi nodes, as shown in FIG. 10. Since the message cannot reach a hidden WiFi node, a WiFI burst from a hidden node 1004 can still interfere with the LAA-LTE reception by the destination LAA-LTE node 1002. In the example of FIG. 10, a data collision occurs between a WiFi burst from hidden node 1004 and a LAA-LTE burst from small cell 100 as both hidden node 1004 and small cell 100 transmit at the same time.

Figure 11:
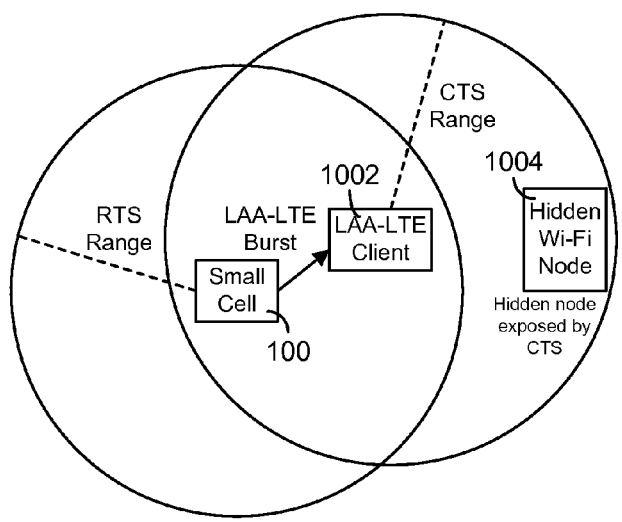
FIG. 11 illustrates a potential solution for the hidden WiFi node problem according to an exemplary embodiment.

One alternative to the CTS2NW mechanism is for WiFi coordinator 104 to send a request-to-send (RTS) that targets destination LAA-LTE node 1002. Destination node 1002 then sends a CTS message as a response, thus notifying hidden WiFi nodes such as node 1004. This is illustrated in greater detail in FIG. 11. Hidden node 1004 is notified of the presence of small cell 100 via the CTS message from destination node 1002.

This scheme assumes that destination LAA-LTE node 1002 has a WiFi interface that operates on the same channel as small cell 100 in some embodiments. This assumption is not unrealistic, since the 5 GHz WiFi AP is configured to operate on the same channel as the LAA-LTE AP in order to provide the necessary coexistence assistance to the LAA-LTE operation. Furthermore, since a single request to send (that targets only a single WiFi client) is sent for a given LAA-LTE transmission period, the entire transmission period on the shared channel is thus assumed to be used for a single LAA-LTE node (in LTE, the small cell can target up to 16 LAA-LTE nodes simultaneously).

Figure 12:
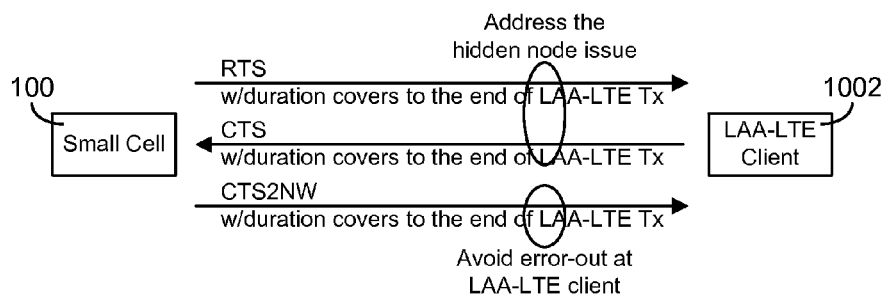
FIG. 12 illustrates the transmitting of a CTS message to another LAA-LTE node according to an exemplary embodiment.

Referring now to FIG. 12, destination LAA-LTE node 1002's WiFi interface may err on the condition that a RTS and CTS exchange is not followed up with a WiFi packet transmitted from the sender of the RTS. This issue can be resolved by configuring WiFi coordinator 104 to send a CTS2NW immediately after receiving a CTS from the target UE (node 1002), with the CTS2NW indicating a NAV (or duration) that covers to the end of the LAA-LTE transmission period. This way, the target (node 1002) removes its expectation for an incoming packet indicated by the earlier RTS.

Figure 13:
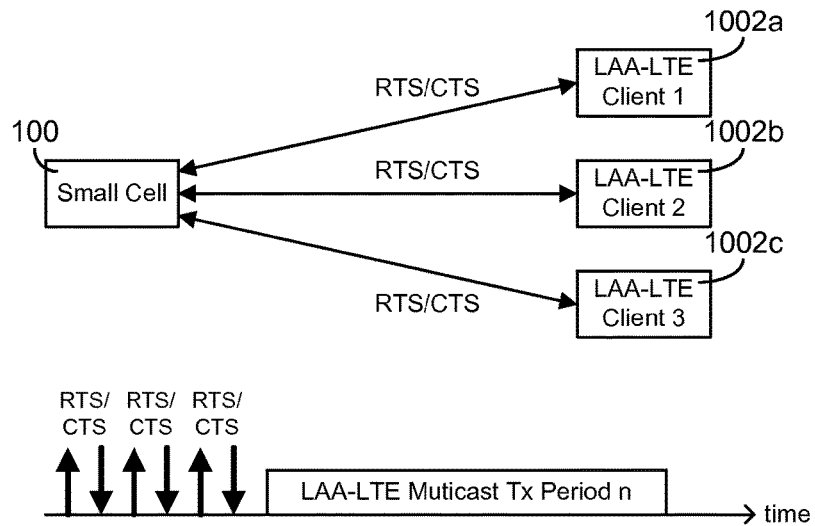
FIG. 13 illustrates a multicast transmission from the small cell to a group of LAA-LTE nodes according to an exemplary embodiment.

To support the multicast transmissions to a multicast group of LAA-LTE nodes (e.g., nodes 1002a-c as shown in FIG. 13) using RTS/CTS, in some embodiments, one of the LAA-LTE nodes in the group is selected to be the target of the RTS. This addresses the hidden node problem for the selected target node, but may or may not be effective for the other nodes in the multicast group. To completely address the hidden-node problem for all nodes, in some embodiments, small cell 100 and more particularly WiFi coordinator 104 of small cell 100 performs a RTS/CTS with each of the nodes in the group before the LAA-LTE AP starts a multicast transmission period, as shown in FIG. 13. If the hidden node problem is not a major concern, in some embodiments, WiFi coordinator 104 uses CTS2NW (or CTS-to-self, or another type of CTS message) instead of RTS/CTS to support the multicast transmissions.

The duration field in a WiFi frame (including RTS, CTS, and CTS2NW) has 15 bits, with the time unit of the duration being microseconds. Therefore, the duration (and thus implied NAV) has a maximum duration of 32 ms. To support LAA-LTE Tx periods that are longer than 32 ms, in some embodiments, WiFi coordinator 104 performs stacked requests to renew the reserved media, as shown in FIG. 14.

Figure 14:
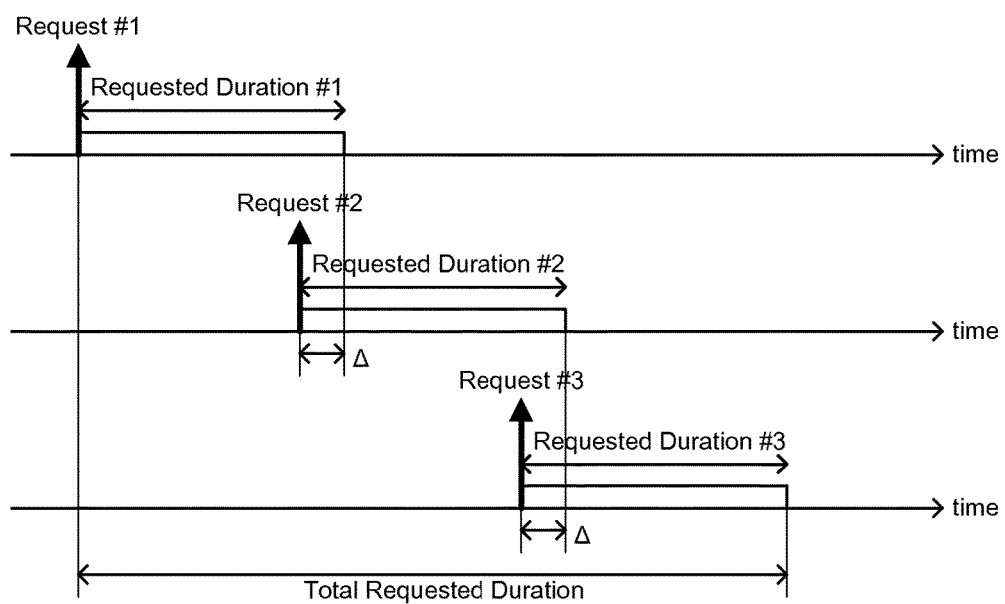
FIG. 14 illustrates a process of stacking requests from the LAA-LTE access point according to an exemplary embodiment.

In the embodiment of FIG. 14, the request is either CTS2NW or RTS/CTS/CTS2NW, and the requested durations are set to the maximum of 32 ms (with the possible exception of the final request). For instance, in FIG. 14, with three requests, if each requested duration is 32 ms and the overlap $\Delta$ is 5 ms, then the total requested duration is 27+27+32=86 ms.

The quality of service (QoS) experienced by the LAA-LTE based traffic is impacted by both LAA-LTE scheduler 120 and WiFi scheduler 140, as described below. There are several options to provide QoS treatment for LAA-LTE Tx requests by WiFi scheduler 140.

Figure 15:
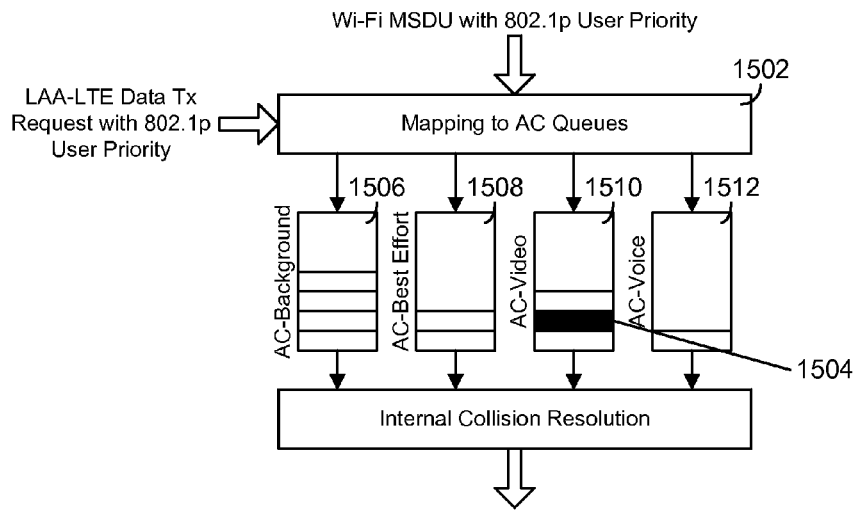
FIGS. 15-16 illustrate a mapping of a LAA-LTE transmission request to an access category queue according to an exemplary embodiment.

Referring now to FIG. 15, in some embodiments, in order to support differentiated QoS for different LAA-LTE transmissions, LAA-LTE AP 102 indicates the QoS priority in each transmission request sent to WiFi coordinator 104. In some embodiments, the priority is coded as 3-bits 802.1p User Priority, which can be used by WiFi coordinator 104 to map (at block 1502) into a corresponding WiFi EDCA Access Category (AC) (e.g., AC-Video block 1510).

In some embodiments, the actual LAA-LTE data is not queued in any of the AC queues; rather, the LAA-LTE transmission request 1504 is queued. In some embodiments, the transmission request for the WiFi packet is first classified into one of 4 AC queues: AC-Background queue 1506, AC-Best Effort queue 1508, AC-Video queue 1510, and AC-Voice queue 1512, each queue having an increasing level of priority. Each of these queues is configured by WiFi AP 1004 with a set of parameters that controls the access contention priority to the media. In some embodiments, a WiFi packet is mapped into a particular AC queue according to the three 802.1p priority bits (8 levels) contained in a 802.1Q VLAN tag in the Ethernet packet (i.e., the WiFi packet contains information used to classify the packet into the appropriate queue).

For WiFi-coordinated LAA-LTE, LAA-LTE scheduler 120 can assign a 802.1p priority value to each of the transmission periods and indicate the values to the WiFi coordinator 104 in the message that indicates the next data transmission period to the WiFi coordinator. In turn, in some embodiments, WiFi coordinator 104 maps the 802.1p value in the message into a particular AC value; and then queues the transmission request message in a corresponding AC queue. With this mechanism, the channel occupancy can be prioritized among all WiFi and LAA-LTE transmissions.

One way of mapping a priority (e.g., 802.1p) into AC queues is shown in the following table:

| 802.1p Priority | WiFi Multimedia (WMM) Access Category |
|---|---|
| 1 2 | Background |
| 0 3 | Best effort |
| 4 5 | Video |
| 6 7 | Voice |

Figure 16:
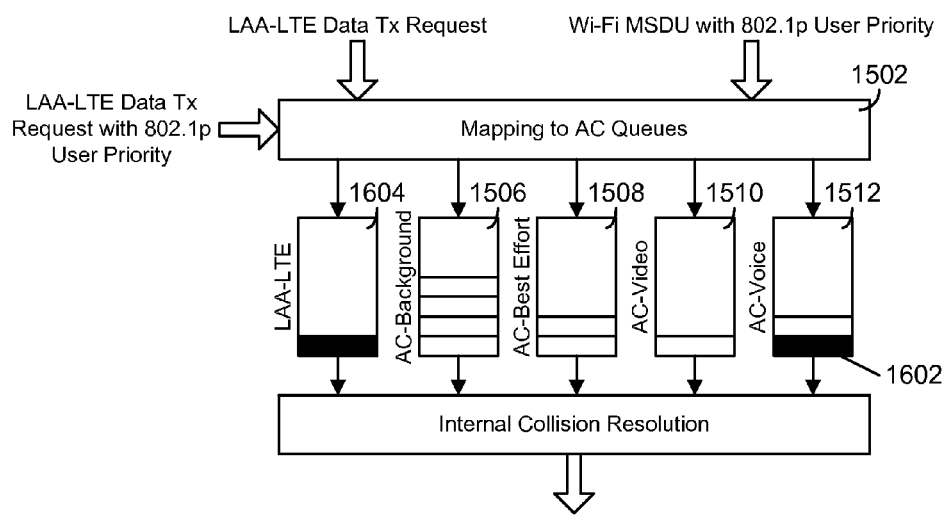

Referring to FIG. 16, in some embodiments, if LAA-LTE traffic in general is considered to have a higher priority than WiFi traffic, then the LAA-LTE data request is, for example, put at the head of AC-Voice queue 1512 (the highest priority AC queue) in position 1602.

In some embodiments, a request is put in a separate non-WiFi dedicated queue 1604 for LAA-LTE Tx requests. The contention behavior for queue 1604 is designed to fit the operator QoS requirements for LAA-LTE traffic, as shown in FIG. 16.

At LAA-LTE scheduler 120, various scheduling strategies are implementable to improve QoS and system performance, and to mitigate the impact of LAA-LTE Tx request latency. In some embodiments, multiple arriving packets are aggregated for block transmission within a single transmission period. The block size can be either fixed (configurable) or variable. In some embodiments, LAA-LTE scheduler 120 predicts and makes pre-requests for arriving packets. Therefore, when the packets arrive, the media is already reserved for transmission of the packets. In some embodiments, periodic transmission requests are made to WiFi coordinator 104 to reserve a segment. If there is no arriving data or not enough arriving data to fill a reserved transmission period, LAA-LTE access point 102 notifies WiFi coordinator 104 to take back the unused time segment and make a new request at the next request cycle. In some embodiments, the above strategies may be combined.

Figure 17:
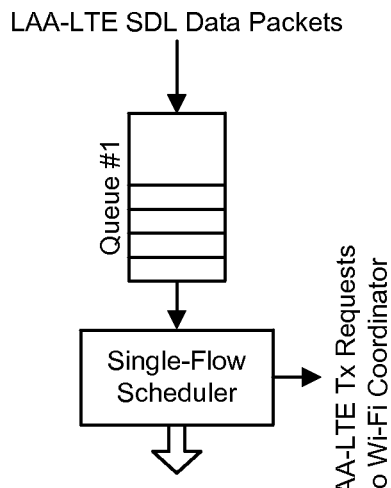
FIGS. 17-18 illustrate a single request flow and multiple request flow for scheduling transmissions for the LAA-LTE access point according to an exemplary embodiment.
Figure 18:
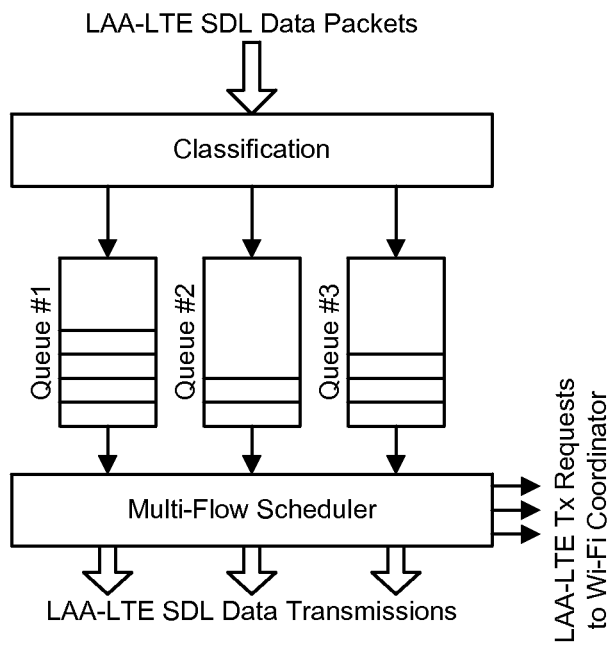

In some embodiments, to provide further QoS capabilities, LAA-LTE scheduler 120 classifies the LAA-LTE SDL data into multiple traffic flows, with each flow having its own independent transmission requests to WiFi coordinator 104. Referring to FIGS. 17-18, a comparison of single-flow scheduling and multi-flow scheduling is shown. In the embodiment of FIG. 17, a single-flow scheduler receives transmission requests one at a time from a queue receiving the requests. In the embodiment of FIG. 18, received requests are classified into one of several queues (e.g., three queues as shown in FIG. 18), and a multi-flow scheduler retrieves the requests from the queues based on a schedule, priority, or other information relating to the types of requests in each queue.

Figure 19:
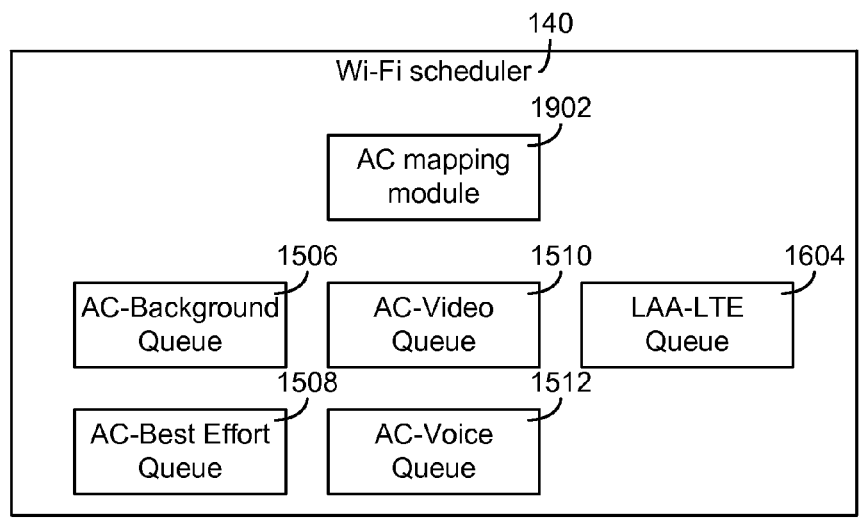
FIG. 19 is a block diagram of the scheduler of the WiFi access point according to an exemplary embodiment.
Figure 20:
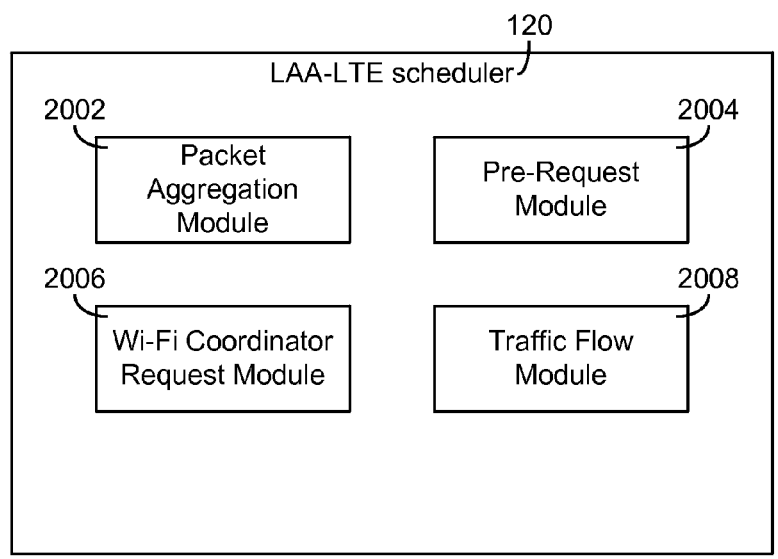
FIG. 20 is a block diagram of the scheduler of the LAA-LTE access point according to an exemplary embodiment.

Referring now to FIGS. 19-20, block diagrams illustrating the activities of schedulers 120, 140 are shown in greater detail. WiFi scheduler 140 is shown to include a AC mapping module 1902 generally configured to manage and control a plurality of queues. AC mapping module 1902 maps each transmission request from LAA-LTE access point 102 to a queue. In some embodiments, AC mapping module 1902 puts the request at the head of a queue, as illustrated in FIG. 16. In some embodiments, AC mapping module 1902 puts the request into one of a AC-Background queue 1506, AC-Best Effort queue 1508, AC-Video queue 1510, or AC-Voice queue 1512, based on the priority of the request. In some embodiments, AC mapping module 1902 puts the request into a LAA-LTE queue 1604 dedicated to non-WiFi requests.

LAA-LTE scheduler 120 is shown to include various modules for scheduling transmissions. LAA-LTE scheduler 120 includes packet aggregation module 2002 configured to aggregate multiple arriving packets for block transmission within a single transmission period. The size of the block in each block transmission may be fixed or variable, according to various embodiments. LAA-LTE scheduler 120 includes pre-request module 2004 configured to make pre-requests for arriving packets, or to predict arriving packets. LAA-LTE access point 102 is then configured to have media reserved for the packets when the packets actually arrive. LAA-LTE scheduler 120 includes WiFi coordinator request module 2006 configured to make transmission requests to WiFi coordinator 104. LAA-LTE access point 102 either receives the packets or notifies WiFi coordinator 104 to make a new request at the next request cycle if no packets are available. LAA-LTE scheduler 120 includes traffic flow module 2008 configured to classify LAA-LTE data into multiple traffic flows, each traffic flow having its own independent transmission requests to WiFi coordinator 104. WiFi coordinator request module 2006 may be configured to provide individual transmission requests for each traffic flow.

Referring generally to FIGS. 21-27, inter-chip communications between APs 102, 104, 106 are described in greater detail according to exemplary embodiments.

Figure 21:
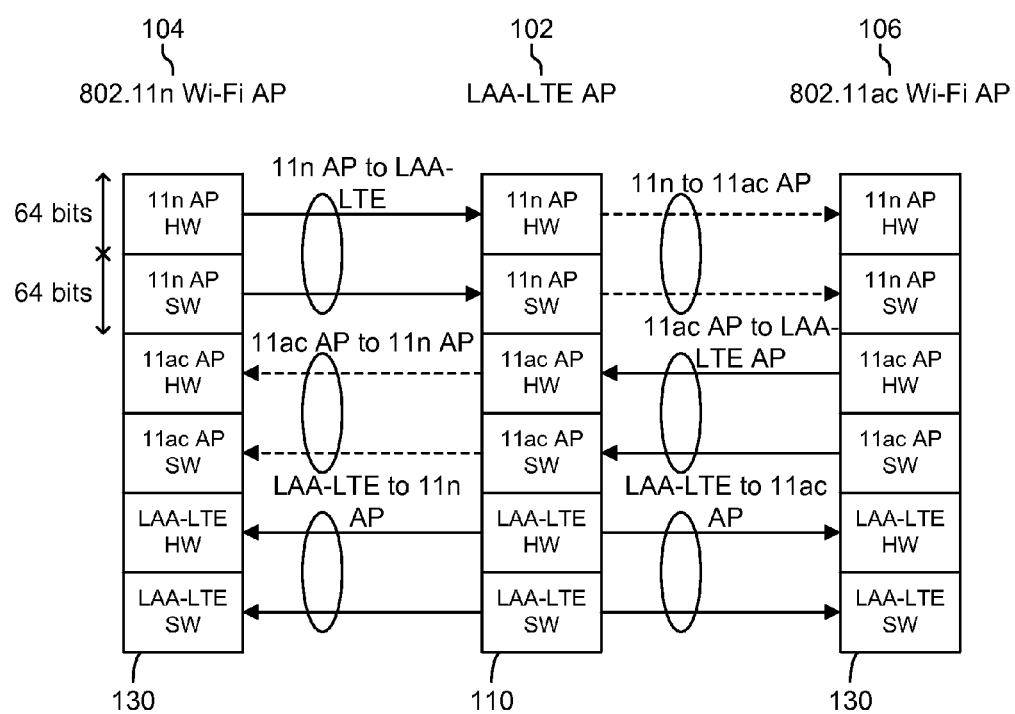
FIG. 21 is a block diagram illustrating the general circuit interfaces (GCIs) of the LAA-LTE access point and WiFi access points according to an exemplary embodiment.

As described in FIG. 2, non-real-time messages (e.g. channel scanning results) between APs 102, 104 are exchanged via a PCIe interface, while the GCI is used to exchange real-time-critical information required to support coordinated data transmissions. In various other embodiments, interfaces other than GCI can be utilized. Referring to FIG. 21, GCI interfaces 110, 130 are shown in greater detail according to an exemplary embodiment. Each AP 102, 104, 106 maintains copies of "registers," each of which is 64 bits. For each connection between LAA-LTE AP 102 and WiFi APs 104, 106, a hardware register contains up to 64 hardware signals from the source to the destination and a software register is used to convey software messages from the source to the destination.

To support the coordinated data transmissions, new software message types and message definitions are defined, so that the required information can be exchanged among the APs. In addition, new hardware signals (timing signals such as WiFi NAV and LAA-LTE Tx event triggers) are introduced and mapped into the GCI hardware pins.

Figure 22:
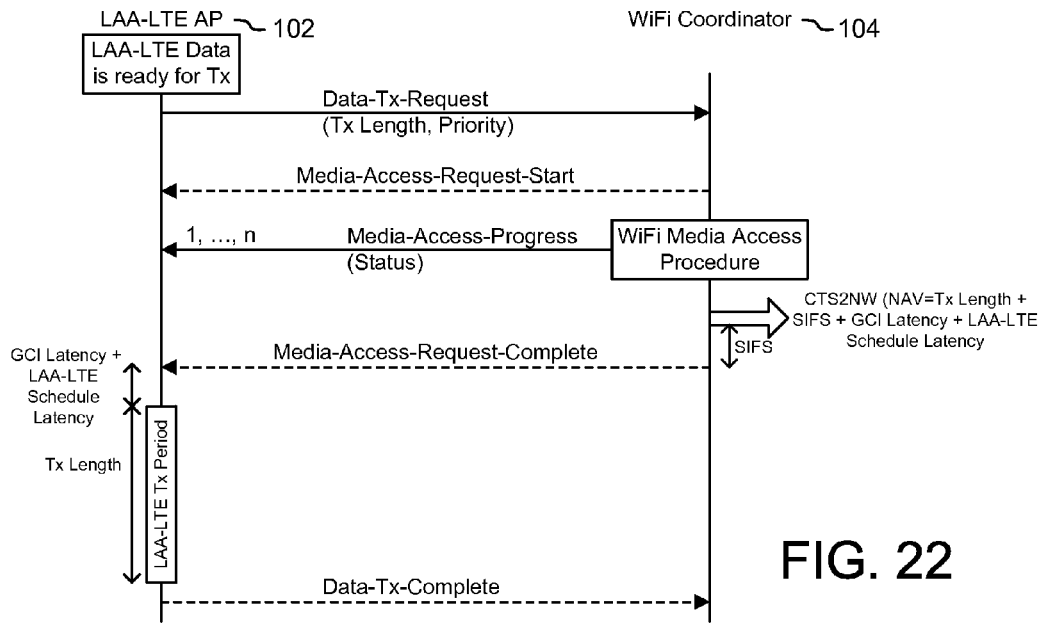
FIG. 22 illustrates a set of GCI messages and signals exchanged between the LAA-LTE access point and WiFi access points according to an exemplary embodiment.

FIG. 22 illustrates a set of GCI messages and signals that are exchanged between WiFi coordinator 104 and LAA-LTE AP 102 in support of LAA-LTE data transmissions with CTS2NW. The solid lines represent the software messages and the dashed lines the hardware signals. LAA-LTE AP 102 transmits the data transmission request to WiFi coordinator 104. The data transmission request includes a transmission length, priority of the transmission, and other relevant information. In response, a media access request is started by WiFi coordinator 104, and the WiFi media access procedure is executed by sending a CTS2NW with a defined NAV value. The status of the media access request is updated at the LAA-LTE AP 102, along with an indication of the completion of the media access request. When the media access request is finished and sent off, the transmission begins at LAA-LTE AP 102 for the given transmission length, after a latency period. An indication of the completion of the transmission is provided to WiFi coordinator 104.

Figure 23:
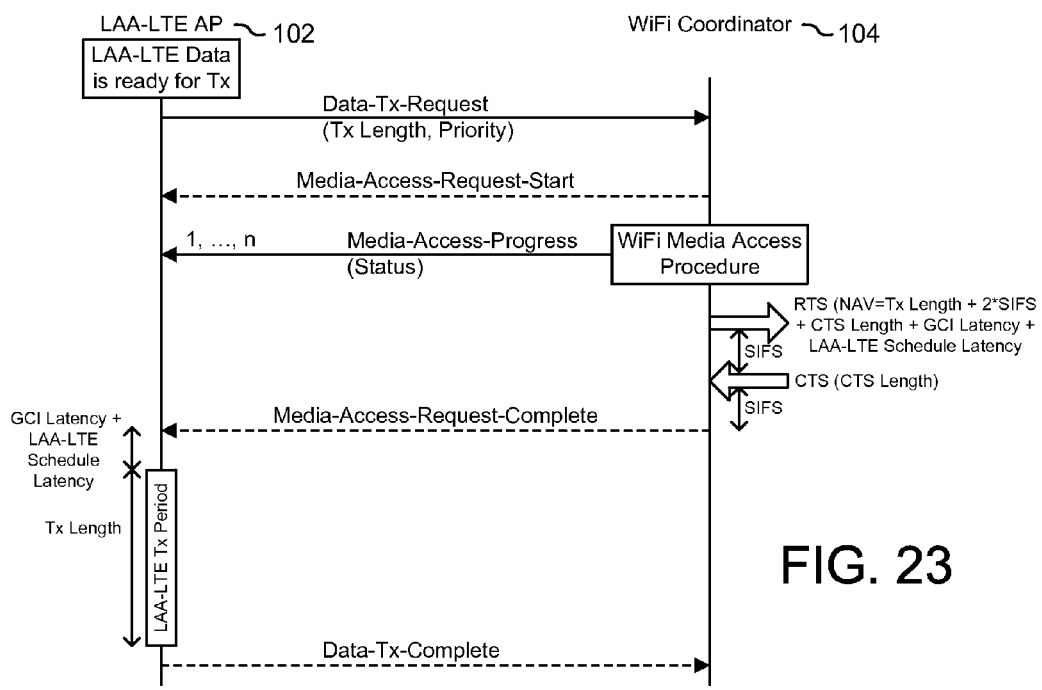
FIG. 23 illustrates LAA-LTE data transmissions with request to send (RTS)/CTS according to an exemplary embodiment.

FIG. 23 shows the case of LAA-LTE data transmissions with RTS/CTS. As compared to the embodiment shown in FIG. 22, an RTS/CTS is transmitted at WiFi coordinator 104 instead of a CTS2NW. WiFi coordinator 1004 receives the CTS from the other node before providing an indication of a completed media access request to LAA-LTE AP 102.

Figure 24:
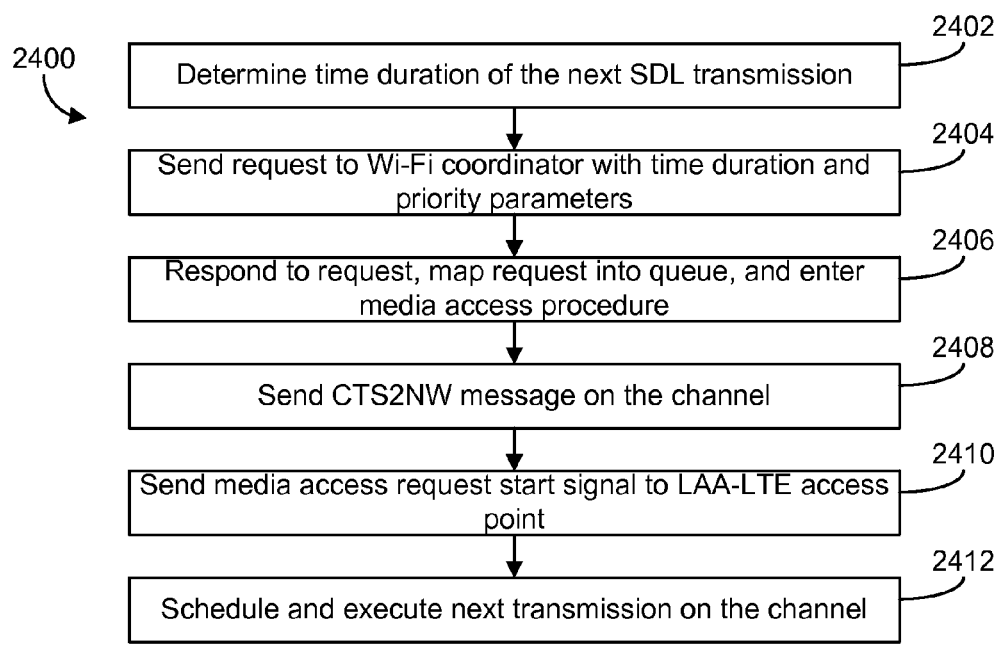
FIG. 24 is a flow diagram of a process for WiFi coordinated LAA-LTE data transmission according to an exemplary embodiment.

Referring to FIG. 24, with the above proposed inter-chip communications shown in FIGS. 21-23, a flow 2400 of operations for WiFi coordinated LAA-LTE data transmission is as follows. At operation 2402, with data in LAA-LTE AP 102 ready for SDL transmissions, the LAA-LTE AP determines the time duration of the next SDL transmission. The time duration depends on multiple factors such as, for example, the current channel activity status, the current size of the transmission queue, and the QoS requirements.

At operation 2404, LAA-LTE AP 102 sends a GCI software message ("Data-TX-Request") to WiFi coordinator 104, with the parameters of Tx Length and Priority. TX Length indicates the time duration of the requested SDL transmission. The time duration may be in, for example, 1 ms intervals, with 1 ms being the minimal transmission length in LTE. Priority specifies the 802.1p priority for the requested transmission, which identifies the priority of the transmission such that a proper transmission window is chosen.

At operation 2406, upon receiving Data-TX-Request, WiFi coordinator 104 responds with a GCI hardware signal ("Media-Access-Request-Start"), maps the request into a particular AC Queue according to the Priority parameter in the request, and enters the standard EDCA media access procedure (as shown in FIG. 15). During this procedure, WiFi coordinator 104 updates LAA-LTE AP 102 about its progress (e.g., backoff, channel status, etc.) with GCI software messages ("Media-Access-Progress").

At operation 2408, once the media is gained for the requested SDL transmission, WiFi coordinator 104 sends a CTS2NW message on the channel. The NAV in the CTS2NW message may be set to TX Length+SIFS+GCI Latency+LAA-LTE Schedule Latency. The Short Inter-Frame Space (SIFS) is the WiFi minimum gap between the CTS2NW and the data transmission. GCI Latency represents the latency for the Media-Access-Request-Complete (described in operation 2410). LAA-LTE Schedule Latency represents any scheduling-related latency between receiving Media-Access-Request-Start and starting to output the data on the channel. The NAV thus indicates to other WiFi nodes sharing the channel about the total duration of channel usage for the next LAA-LTE data transmission. The NAV does not include the duration of the WiFi acknowledgement message, since the message is not sent by the target node for the LAA-LTE transmission.

At operation 2410, after a delay for the SIFS time, WiFi coordinator 104 sends a GCI hardware signal ("Media-Access-Request-Start") to LAA-LTE AP 102 to trigger its data transmission.

At operation 2412, upon receiving the signal from WiFi coordinator 104, LAA-LTE AP 102 schedules and executes the next transmission on the channel. Once the transmission is complete, LAA-LTE AP 102 sends a GCI hardware signal ("Data-TX-Complete") to WiFi coordinator 104, which concludes the current flow 2400. Flow 2400 is then repeated for subsequent transmissions.

In some embodiments, if RTS/CTS (instead of CTS2NW) are used to clear the channel for the LAA-LTE transmissions, operation 2408 is modified in accordance with FIG. 23. Further, the initial data transmission request includes a DA parameter, which specifies the destination MAC address of the WiFi client in the target node. In some embodiments, flow 2400 is extended to handle the case of a RTS-CTS-CTS2NW sequence as discussed earlier to deal with the hidden-node issue.

The above description in process 2400 does not reference address error cases such as timeouts and error parameters, etc. Appropriate error handling may be incorporated into flow 2400 in various embodiments.

Figure 25:
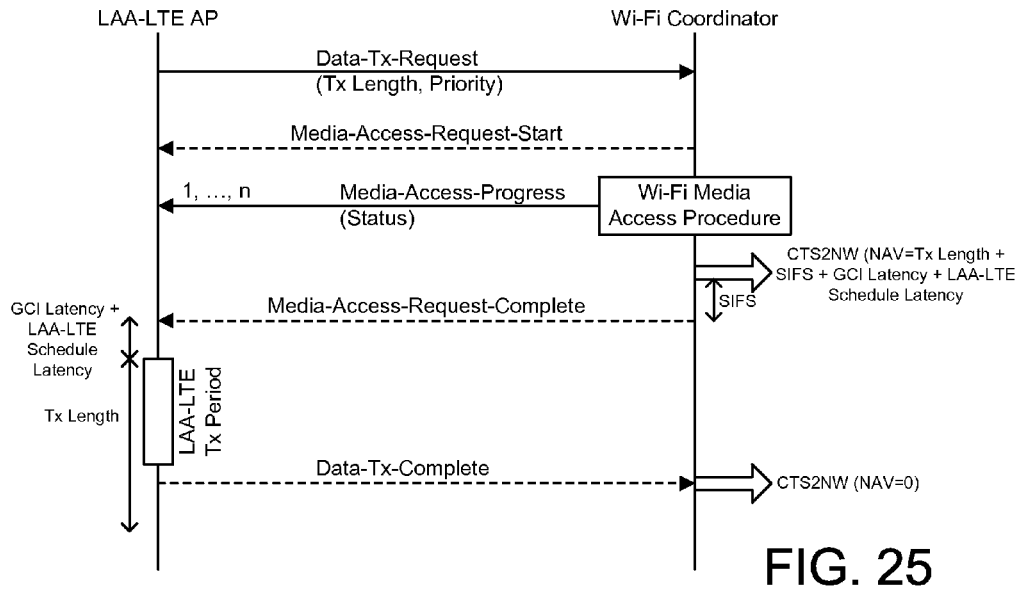
FIGS. 25-26 illustrate a condition for which there is sufficient reserved transmission time for the LAA-LTE access point according to an exemplary embodiment.
Figure 26:
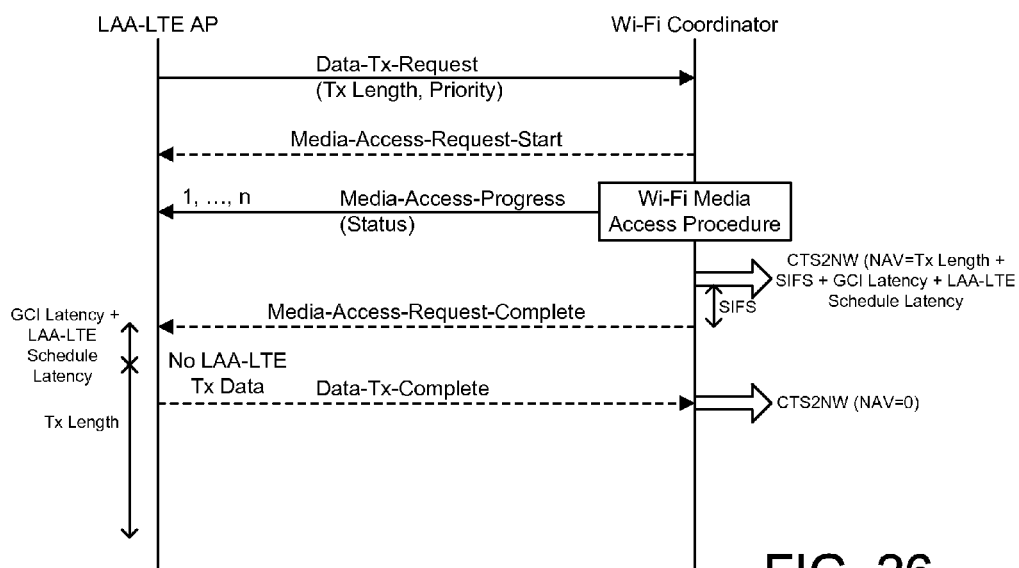

Furthermore, flow 2400 assumes that when LAA-LTE AP 102 receives the Media-Access-Request-Complete message, there is enough data ready to transmit and to fill the WiFi-reserved transmission interval. However, in the case that there is sufficient reserved transmission time left over (configurable), it is desirable for LAA-LTE AP 102 to notify WiFi coordinator 104, so that the latter can cancel the left-over served media access time. WiFi coordinator 104 can cancel the reserved time by sending a CTS2NW with the duration field (NAV) set to "0." FIG. 25 illustrates the case of transmission time being left over from a transmission by LAA-LTE AP 102. A CTS2NW with a NAV value of 0 is transmitted. FIG. 26 illustrates the case of there being no data ready for transmission during the reserved transmission interval. A CTS2NW with a NAV value of 0 is transmitted. If RTS/CTS is used instead of CTS2NW, the process as illustrated in FIGS. 25-26 may be modified accordingly as described above.

Figure 27:
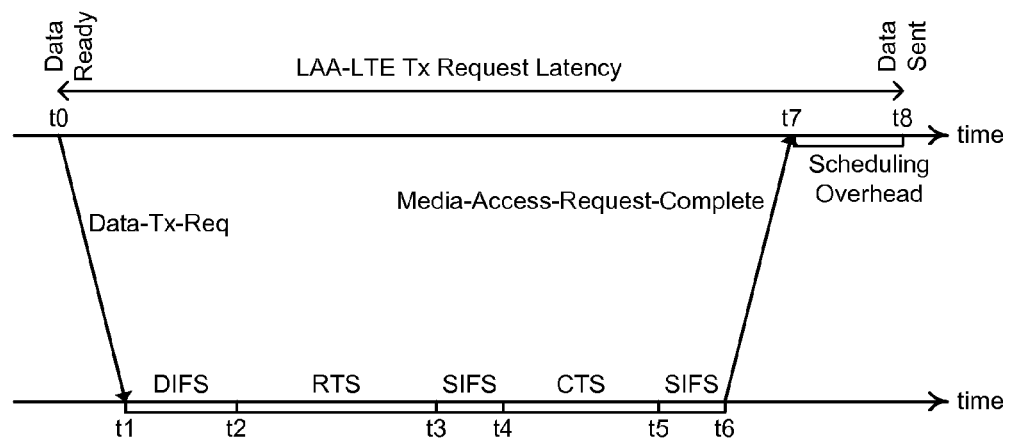
FIG. 27 illustrates latency between the time the LAA-LTE access point makes a request and when the LAA-LTE access point transmits data according to an exemplary embodiment.

There exists latency between the time when LAA-LTE AP 102 makes a data transmission request to WiFi coordinator 104 and the time when LAA-LTE AP 102 actually transmits the data to the media. This latency is represented by multiple stages involved in the media reservation for LAA-LTE, as shown in FIG. 27. FIG. 27 illustrates a RTS/CTS process for reserving the channel, and assumes an RTS can be sent out after a minimum waiting time (distributed coordination function (DCF) interframe space, or DIFS) without any back-off.

In FIG. 27, the time periods for each segment are as follows:

| | |
|---|---|
| t0-t1 | GCI latency for software message |
| t1-t2 | DIFS = 34 µs |
| t2-t3 | RTS TX time |
| t3-t4 | SIFS = 16 µs |
| t4-t5 | CTS TX time |
| t5-t6 | SIFS = 16 µs |
| t6-t7 | GCI latency for hardware signal |
| t7-t8 | LAA-LTE AP scheduling latency |

Assume that RTS and CTS are transmitted with a lowest data rate (most robust) of 6 Mbps. The total transmission time of RTS and CTS (including two SIFS time intervals) is then 128 µs. Therefore, the minimum WiFi media access latency (without back-off) is 34+128=162 µs. The corresponding LAA-LTE Tx request latency is 162 µs+total GCI latency+LAA-LTE scheduling latency, where total GCI latency=(t6−t7)+(t0−t1).

As can be seen, the LAA-LTE Tx request latency can be significant and may degrade the LAA-LTE SDL throughput if the request is made for each arriving packet sequentially. In various embodiments, several LAA-LTE scheduling strategies are adopted to mitigate the impact of this latency, including the ones described above relating to the QoS.

Referring generally to FIGS. 3-5 and FIG. 9, a carrier sensing and channel selection flow of operations is described. For example, FIG. 4 illustrates four sensed carriers (e.g., channels), of which one or more may be selected for transmission in some embodiments. Referring now to FIGS. 28-36, a carrier sensing and channel selection process is described in greater detail.

LAA-LTE AP transmissions take place within a series of transmission windows. LAA-LTE scheduler 120 determines the transmission windows according to various scheduling policies, which take into consideration QoS requirements and LAA protocol capabilities and restriction, as described above. Referring generally to FIGS. 28-36, the procedures for LAA-LTE AP transmission in a given scheduled transmission window are described.

Figure 28:
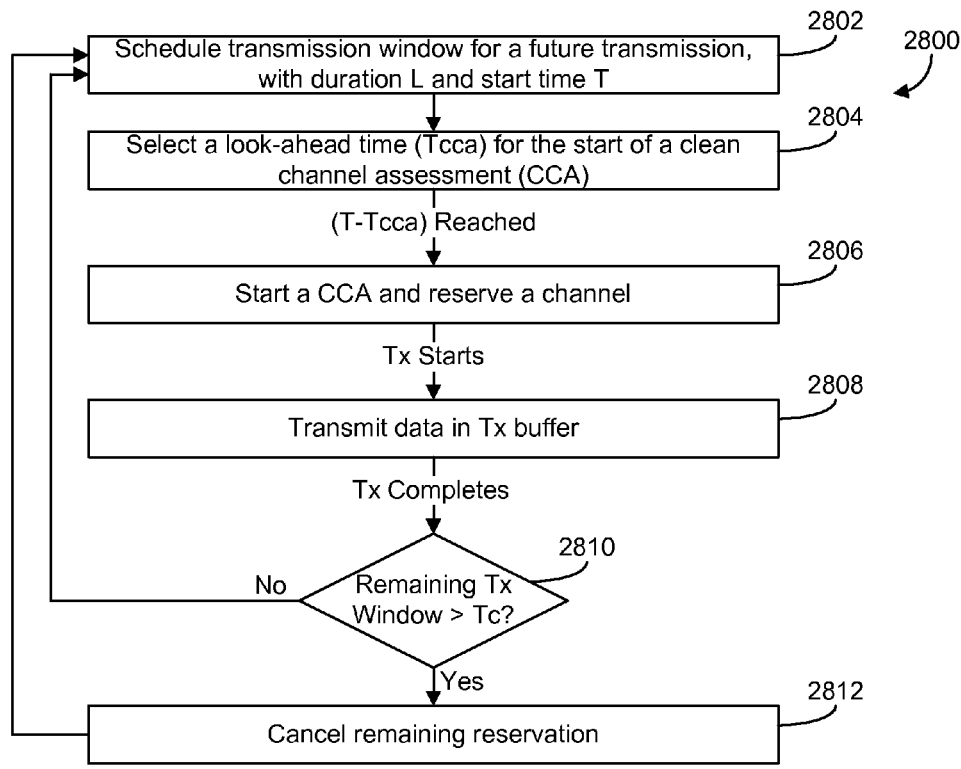
FIG. 28 is a flow chart of a process for carrier sensing and channel reservation according to an exemplary embodiment.

Referring to FIG. 28, a flow chart of a flow 2800 of operations for carrier sensing and channel reservation is shown, according to an exemplary embodiment. Flow 2800 may be used by the LAA-LTE AP to reserve a channel in the unlicensed band for future communications. Flow 2800 is executed by, for example, channel selector 118 or scheduler 120 of LAA-LTE AP 102 as described with reference to FIG. 2.

Flow 2800 includes scheduling a transmission window for a future transmission (operation 2802). The transmission window has a duration or window of length L and a start time T. Flow 2800 further includes selecting a look-ahead time (Tcca) for the start of a clean channel assessment (operation 2804). The clean channel assessment (hereinafter abbreviated CCA) determines if a channel is ready and clear for transmission. The look-ahead time Tcca is chosen such that the CCA completes before the start time T. In some embodiments, the look-ahead time Tcca is dynamically changed to adapt to channel conditions. For example, if the CCA completes substantially before the start of a transmission window for multiple consecutive windows, Tcca may be subsequently shortened for future transmissions. As another example, Tcca may be lengthened for subsequent transmissions if the CCA does not complete in time for a given transmission window in some embodiments.

Process 2800 further includes, when time T-Tcca is reached, starting a CCA and reserving a channel (operation 2806). The CCA and channel reservation operation is performed by, for example, WiFi coordinator 104 as described in FIG. 2. In the present disclosure, the WiFi coordinator may also be referred to as the Robust Coexistence Coordinator, or RCC.

Following the CCA and channel reservation, there are three possible scenarios. In one scenario, the CCA completes at a time such that a channel reservation procedure can then be completed before the specified start time T. The channel reservation procedure may then be completed. In a second scenario, the CCA completes at a time before the start time T, but at a time such that a channel reservation procedure cannot be completed before the specified start time T. In some embodiments, in this scenario, LAA-LTE AP 102 initiates transmission at start time T without reserving the channel. In a third scenario, the CCA does not complete before the start time T. In some embodiments, in this scenario, the CCA run is terminated, and the LAA-LTE AP may proceed in one of various ways (i.e., proceeds with a transmission anyways, restarts the CCA and channel reservation operation, delays a transmission, etc.).

Flow 2800 further includes, at start time T, transmitting data in Tx buffer 116 (operation 2808) in some embodiments. After the transmission completes, process 2800 checks if the remaining time in the transmission window is greater than a threshold time Tc (operation 2810). If so, the remaining channel reservation may be cancelled (operation 2812) by the RCC, freeing the channel for other transmissions during the remaining time. In either event, process 2800 returns to operation 2802 and schedules a next transmission window for the LAA-LTE AP in some embodiments.

Referring further to operation 2806 and to FIGS. 29-34, various scenarios that can occur during a CCA and channel reservation operation are shown, according to exemplary embodiments. The CCA and channel reservation operation are executed to determine if a channel is available for transmission and to reserve the channel for the transmission. As described above, three scenarios are possible during a CCA and channel reservation operation.

Figure 29:
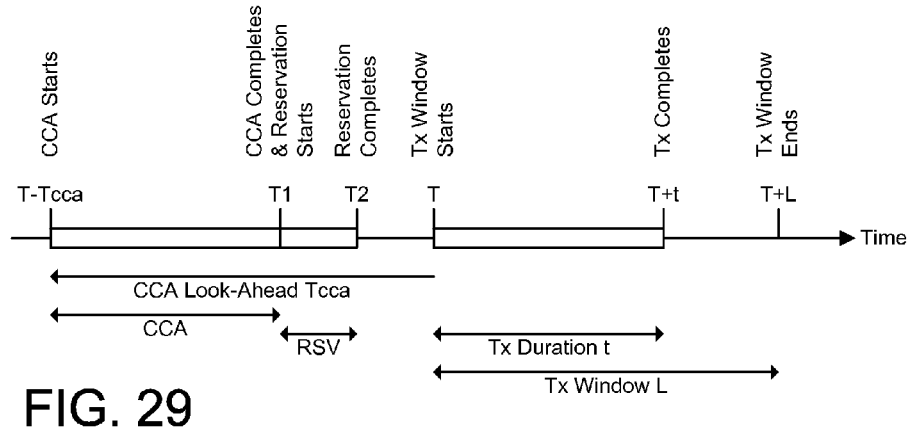
FIG. 29 illustrates a diagram of a scenario where a LAA-LTE access point runs a clear channel assessment (CCA) and reserves a channel for communications according to an exemplary embodiment.

A first scenario is that the CCA completes at a time T1 such that the time before the start time of the transmission (T–T1) is large enough to complete a channel reservation procedure before start time T. Referring to FIG. 29, a timing diagram of such a scenario is shown. In the illustrated exemplary embodiment, in this scenario, the CCA starts at a time T-Tcca and completes at time T1. Since the time before the start of transmission (T–T1) is greater than a threshold time, LAA-LTE AP 102 starts the channel reservation process at time T1. The channel reservation process completes at a time T2 before start time T. The channel is reserved until time T+L, covering the entire window length L. The buffered data is transmitted at time T until the buffered data is exhausted or T+L has been reached. If the buffered data is completely transmitted at a time T+t before T+L, and L–t is larger than a configurable threshold Tc, then the LAA-LTE AP may cancel the remaining channel reservation. Otherwise, the LAA-LTE AP waits for the next transmission window.

Figure 30:
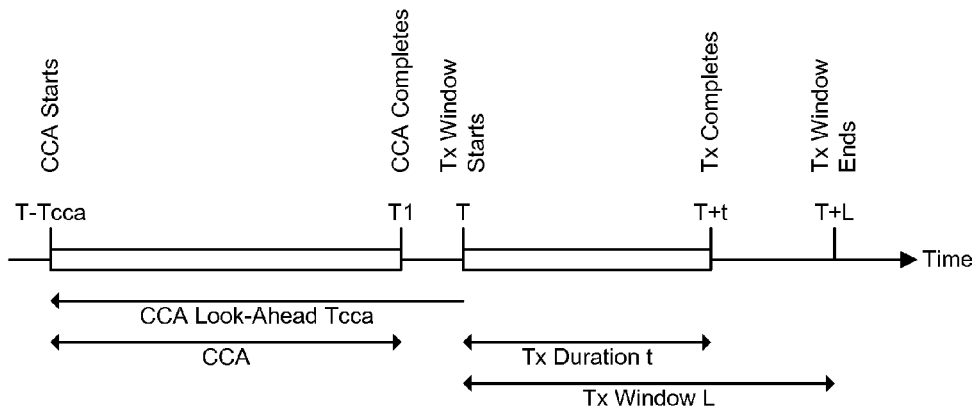
FIG. 30 illustrates a diagram of a scenario where a LAA-LTE access point runs a CCA but does not reserve a channel for communications according to an exemplary embodiment.

A second scenario is that the CCA completes at a time T1, but the time before the start time of the transmission (T–T1) is not large enough to complete a channel reservation procedure before start time T. Referring to FIG. 30, a timing diagram of such a scenario is shown. In this scenario, the LAA-LTE AP may proceed as described in FIG. 29, with the exception of skipping the channel reservation process.

Figure 31:
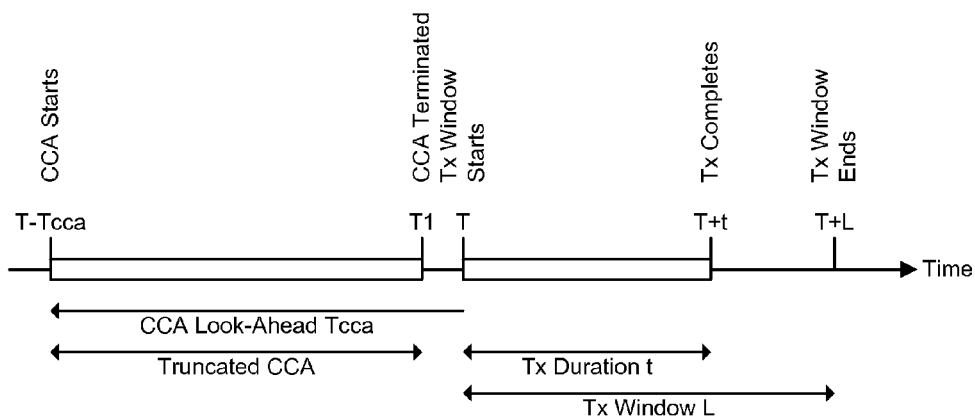
FIG. 31 illustrates a diagram of a scenario where a LAA-LTE access point terminates a CCA run and begins transmission on a channel according to an exemplary embodiment.

A third scenario is that the CCA is not completed before start time T. In this case, the CCA may be terminated. The LAA-LTE AP may proceed in one of several ways. Four exemplary embodiments for proceeding in this scenario are illustrated in the diagrams of FIGS. 31-34. The first choice, illustrated in FIG. 31, is to proceed immediately to the transmission of the data in the buffer. The CCA is not completed and is terminated at either time T or a time shortly before T. The transmission may then start, at time T, as generally described in FIGS. 29 and 30, only without reserving the channel.

Figure 32:
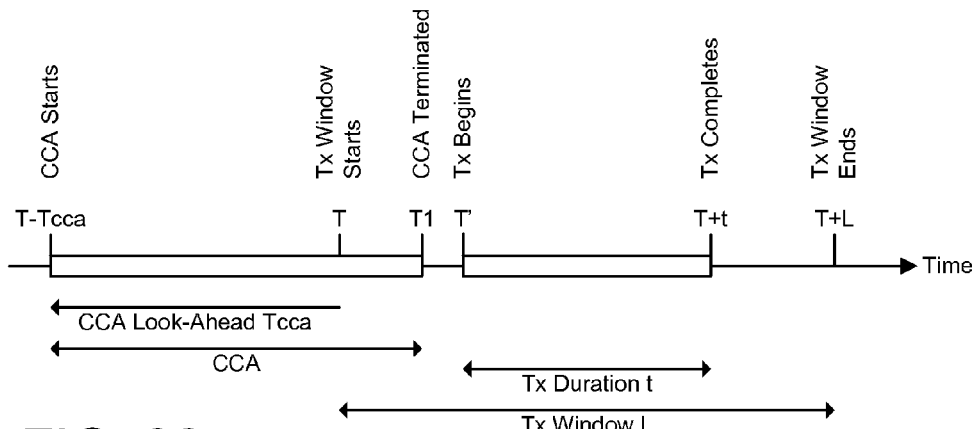
FIG. 32 illustrates a diagram of a scenario where a LAA-LTE access point waits for a transmission of a packet associated with a CCA before starting transmission on a channel according to an exemplary embodiment.

The second choice, illustrated in FIG. 32, is to wait for the transmission of the current WiFi packet associated with the CCA to be finished at time T1, if there is an ongoing WiFi packet transmission and the transmission time is known. This transmission is finished even though time T1 is after time T. Then, the LAA-LTE transmission may then start at a time T' after time T1, and may proceed without reserving the channel.

Figure 33:
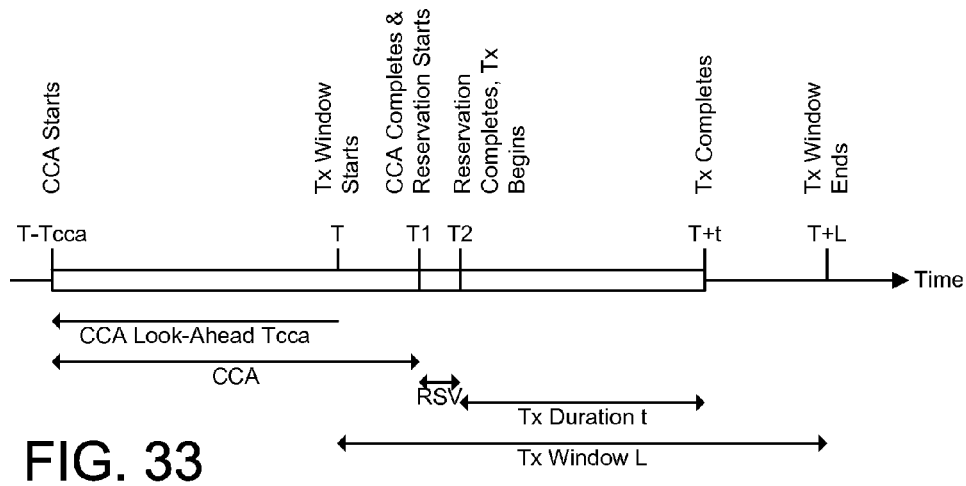
FIG. 33 illustrates a diagram of a scenario where a LAA-LTE access point waits for a transmission of a packet associated with a CCA before channel reservation and transmission according to an exemplary embodiment.

The third choice, illustrated in FIG. 33, is similar to the choice shown in FIG. 32; however, the channel reservation process may still be carried out. After waiting for the transmission of the current WiFi packet associated with the CCA to be finished at time T1, the channel reservation process may start at time T1 and finish at time T2. The LAA-LTE transmission may then start at time T2.

Figure 34:
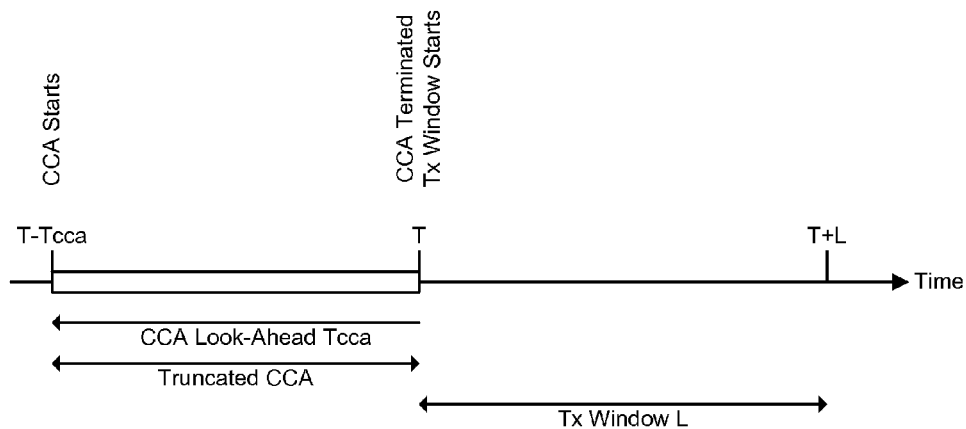
FIG. 34 illustrates a diagram of a scenario where a LAA-LTE access point terminates a CCA run and waits to a next transmission window to begin transmission according to an exemplary embodiment.

The fourth choice, illustrated in FIG. 34, is to skip the current transmission window and restart the process (operation 2806) in the next transmission window. The CCA is terminated at the time T at which the transmission window was to start.

The CCA may be executed as one or both of a physical CCA or a logical CCA. Referring in greater detail to operation 2806, according to some exemplary embodiments, the RCC executes a physical CCA by detecting the PHY preamble to a transmitted WiFi frame and the overall signal energy level contributed by all sources (i.e., executing the clear channel assessment based on information detected by the RCC). Additionally or alternatively, the RCC executes a logical CCA based on NAV values in the MAC header of a transmitted WiFi frame (i.e., executing the clear channel assessment based on information transmitted from another node).

For any given time slot duration (e.g., a 9 µs), the channel is declared busy by the physical CCA if the channel is determined busy according to either preamble detection or energy detection (described in further detail below). The channel is declared busy by logical CCA if the time slot duration is covered by the NAV period. In some embodiments, if both physical and logical CCA methods are used by the RCC, the channel is declared busy for any given time slot duration when either physical or logical CAA determines that the channel is busy.

In order for the RCC to declare that a channel is ready for transmission, it may combine the CCA methods with a back-off procedure (the complete process of a combined CCA method and back-off procedure is referred to in the disclosure as a CCA run). The successful completion of a CCA run indicates that the channel is ready for LAA-LTE transmission. If the channel is declared idle by the CCA operation when CCA starts and remains idle for a threshold time (e.g., DIFS, equal to SIFS+2*time slots), the back-off procedure may not be utilized, and the CCA run is completed after the wait.

For preamble detection in a packet of data, in some embodiments, the RCC carries out auto-correlation (e.g., up to a 8 µs correlation window) to detect a 802.11a physical layer convergence protocol (PLCP) preamble. If the PLCP preamble is detected, the RCC decodes the legacy signal (L-SIG) field (e.g., 4 µs, 1 OFDM symbol) that follows the PLCP preamble. L-SIG is coded with a fixed binary phase-shift keying (BPSK)½ rate. The length subfield of L-SIG (e.g., 12 bits, byte unit) is extracted. The length subfield is converted into its corresponding time value (e.g., µs unit). The PHY-COUNTER field is loaded with the converted length value, and the countdown is started. The channel is declared busy until the counter value reaches '0'.

For the conversion of the length subfield from a byte count to a time count, the subfield value is multiplied by eight and the product is divided by the value of Mbps from the decoded L-SIG RATE field. Alternatively, a fixed table of ticks is used to count down per time period (e.g., 4 µs). For example, if the rate is 6 Mbps, then each 4 µs counts as 3 bytes from a byte counter; if the rate is 9 Mbps, then each 4 µs counts as 4.5 bytes; if the rate is 12 Mbps, then each 4 µs counts as 6 bytes, etc.

For energy detection, in some embodiments, the RCC detects the energy of all signals in the channel. If the total signal level exceeds a threshold (e.g., −62 dBm), the medium is declaimed busy.

The RCC performs NAV detection for data packets (including RTS and CTS). The RCC uses the rate subfield in L-SIG (obtained from preamble detection) to determine the payload rate, and extracts the duration field (e.g., 16 bits, µs unit) in the MAC header (at the beginning of the PLCP payload data). The least significant 15 bits of the duration field are loaded into the MAC-counter field (i.e. NAV counter), if the most significant bit of the field is not set. The channel is declared busy until the counter value reaches '0'.

In some embodiments, the back-off procedure is defined by a set of parameters that include the back-off window sizes (CWmin and CWmax) and the initial defer time (AIFS). These parameters are configured according to fairness policies of the LAA-LTE AP. In one embodiment, the parameters are configured to have the same values as those for the voice access category (AC_VO). In another embodiment, they are configured to have a smaller back-off window (smaller CWmin and CWmax) and shorter AIFS than AC_VO, if LAA-LTE transmissions are deemed to have higher priority than the standard highest-priority category, AC_VO.

In some embodiments, for the scenarios illustrated in FIGS. 32-33, when the CCA run extends beyond the beginning of the transmission window because of an ongoing WiFi frame transmission, the RCC adds another back-off (with a small back-off window) after the ongoing WiFi frame transmission is completed. Thus, the transmission completion does not cause synchronized transmissions from multiple co-channel LAA-LTE APs.

In some embodiments, the added back-off works as follows. Upon the completion of the ongoing WiFi frame transmission, the RCC chooses a random number and counts down an amount of time equivalent to the number. If the channel becomes busy before the countdown is done, then the RCC waits for the next busy to idle transition and tries again. The random value should be chosen in a range that is smaller than normal, e.g., a range of 0 to 7 time slots (i.e., 0 to 63 µs). Before counting this random time, there should always be a threshold count (e.g., SIFS+2*SLOT=16+ 18=34 µs), during which the channel should be idle.

In some embodiments, for a N×20 MHz (e.g. 2×20=40 MHz) channel, the RCC performs the above mentioned CCA in each of the component 20 MHz channels independently. The aggregate N×20 MHz channel is considered busy if either of the component channels is busy. In various embodiments, based on the channel activities, the channel width is dynamically switched among N×20 MHz channels at appropriate intervals (e.g., 20 or 40 ms). These channels can be adjacent or non-adjacent.

There are two basic methods for the RCC to perform channel reservation. In one embodiment, the RCC may send CTS2NW only, and in another embodiment the RCC may perform RTS/CTS/CTS2NW exchanges with the target device (as described above). In both embodiments, the reservation time (or NAV value) set in the duration field of the MAC header covers the time period extending to the end of the transmission window.

In some embodiments, the LAA-LTE AP uses a modulation and coding scheme (MCS) in the basic set service (BSS) basic rate set (typically 6, 12, and 24 Mbps) to code RTS and CTS2NW. If RTS/CTS/CTS2NW is used for multicast transmissions, the reservation message exchange is repeated for each UE in the multicast group. Furthermore, if the required reservation time exceeds a threshold time (e.g., 32 ms), the reservation operations may be stacked to extend beyond the threshold time.

Figure 35:
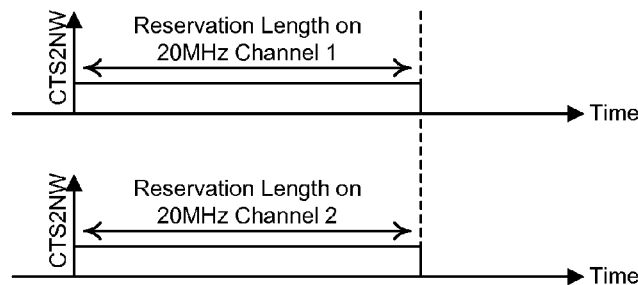
FIG. 35 illustrates a reservation scheme with respect to a CTS-to-nowhere (CTS2NW) message according to an exemplary embodiment.

For a given reservation mechanism and the used coding rate, the LAA-LTE AP is able to calculate the time it will take to perform the reservation message exchanges. For example, for a 40 MHz channel, the reservation procedure is carried out in each of the two component 20 MHz channels independently. The RTS and CTS messages are sent simultaneously as a pair of 20 MHz transmissions, with synchronized NAV values included in the messages (i.e. the values all indicate the same completion time of the reservation). FIG. 35 illustrates the reservation scheme with respect to the CTS2NW method.

If the LAA-LTE AP cannot use up the entire transmission window reserved by the RCC, it can inform the RCC to cancel the remaining reservation. In one embodiment, the reservation is cancelled by sending a CTS2NW with a NAV value set to "0". For example, if a 40 MHz channel was initially reserved, the LAA-LTE AP cancels the reservation on both 20 MHz channels independently.

Figure 36:
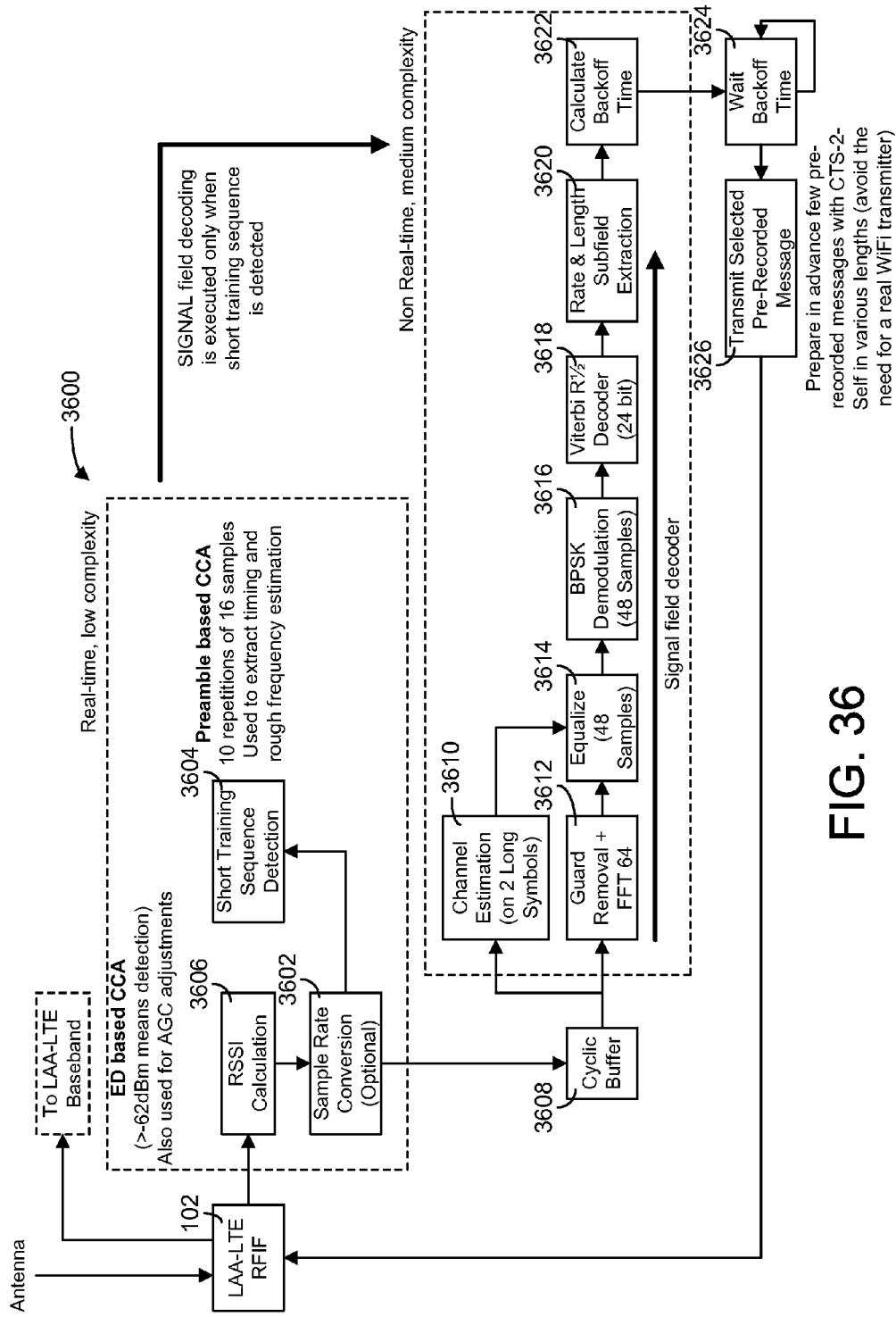
FIG. 36 is a block diagram of a module for executing a CCA and channel reservation process according to an exemplary embodiment.

In some embodiments, the RCC is implemented by an external WiFi AP, and the RCC procedures (CCA and channel reservation) are performed by the WiFi AP. In another embodiment, the RCC is implemented by an integrated module of the LAA-LTE AP. An example system 3600 is shown in FIG. 36. In the embodiment of FIG. 36, various modules 3602-3626 of system 3600 are shown that illustrate the various operations of implementing RCC procedures. Some modules 3602-3606 may be executed in real-time to determine various channel properties, while modules 3610-3622 may be executed in non-real time.

System 3600 is shown to include a LAA-LTE AP 102, and more particularly an interface (LAA-LTE RFIF) that delivers receive/transmit samples between a RF integrated circuit (RFIC) and the baseband module at a native LTE sampling rate. System 3600 receives the sampling rates. System 3600 is shown to include an (optional) sample rate conversion module 3602. Module 3602 is a filter that converts the sampling rate from the LTE rate to the WiFi rate. System 3600 further includes a short training sequence detection module 3604 that auto-correlates to detect a short training sequence in the WiFi preamble. System 3600 further includes a RSSI calculation module 3606, which calculates channel energy detection.

The system of FIG. 36 includes a cyclic buffer 3608. Buffer 3608 stores fast Fourier transformation (FFT) symbols to be decoded by modules 3610-3622. Channel estimation module 3610 is configured to estimate channel parameters such as timing, frequency offset, etc. from the symbols. Guard removal module 3612 is configured to remove guard time from the signals. Equalizer 3614 is configured to perform channel equalization. BPSK demodulation module 3616 is configured to perform demodulation of received BPSK signals. Viterbi R1/2 decoder 3618 is a ½ rate Viterbi decoder for the signals. Rate and length subfield extraction module 3620 is configured to decode data rate and frame length information from the signal. Backoff time module 3622 is configured to calculate a backoff time duration. At block 3624, the system waits for a backoff time, and at block 3626, a pre-recorded message is selected and transmitted after the backoff time.

In one embodiment, the module may repeat a CCA run one or more times before a CTS2NW is sent out. For example, the first CCA run may start too early (e.g., 5 ms) before the transmission window start time and the first CCA run may be completed long before the start of the transmission window (e.g., in an extreme case, the CCA is done after DSIF, which is 36 μs). In this embodiment, instead of sending CTS2NW right away to hold the channel, the LAA-LTE AP may repeat the CCA run until the transmission window is closer (e.g., ½ ms) and then send out the CTS2NW.

In some embodiments, a given CCA may be terminated before completion. This can occur if the LAA-LTE AP decides to go ahead with a transmission when its transmission window starts, even though there may be ongoing WiFi transmission on the channel.

In some embodiments, the RCC does not send CTS2NW after a CCA. In such an embodiment, the LAA-LTE AP withholds the sending of the CTS2NW after a CCA if the transmission window is about to open.

In some embodiments, the RCC may configure parameters such as the energy detection threshold, the back-off initial wait (AIFS) and the window size (Cmin and Cmax). In one embodiment, the duration field (NAV value) in the MAC header of CTS2NW is set per message. Therefore, the pre-recorded CTS2NW messages need to be configured for this field per message (since the duration is not known beforehand).

Figure 37:
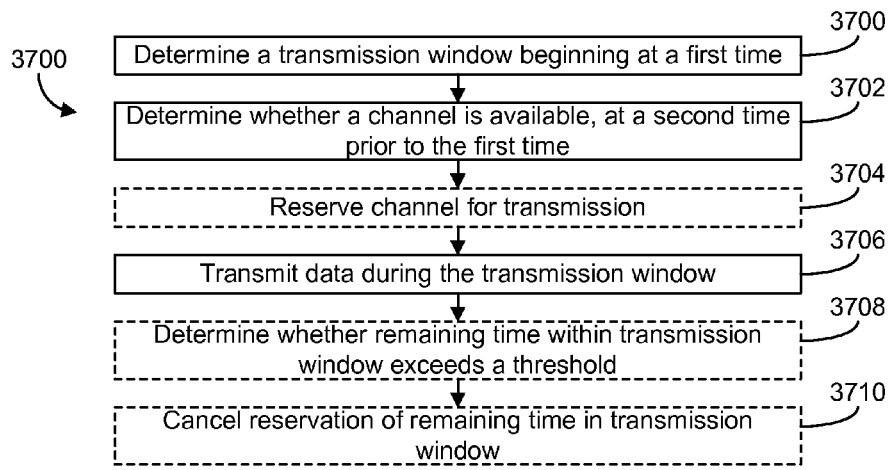
FIG. 37 is a flow chart of a process for transmitting data during a transmission window on a channel, according to an exemplary embodiment.
Figure 38:
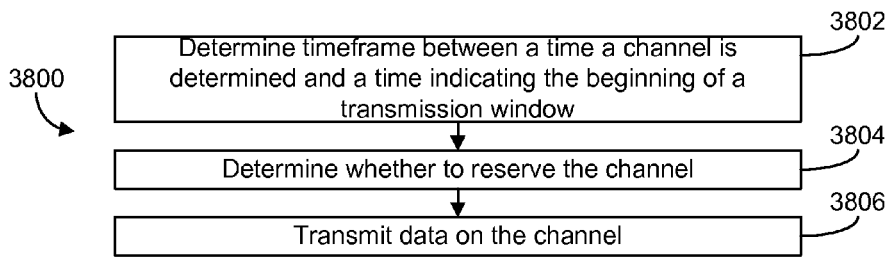
FIG. 38 is a flow chart of a process for determining whether to reserve a channel, according to an exemplary embodiment.
Figure 39:
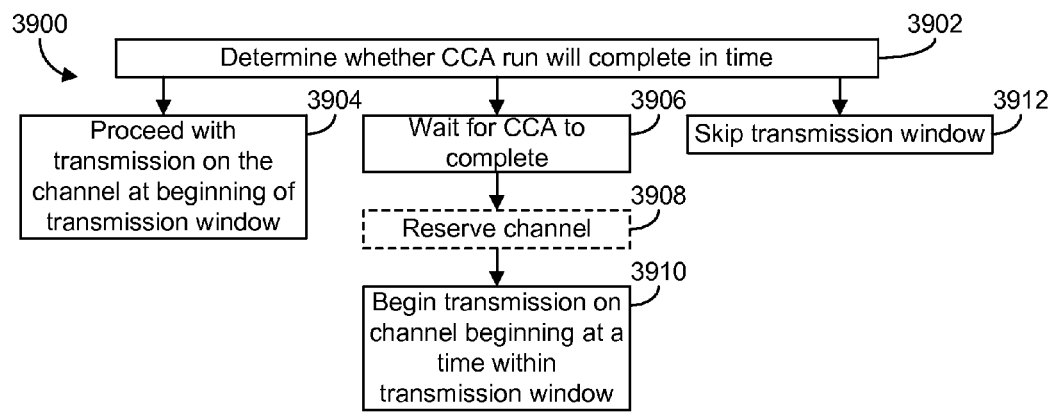
FIG. 39 is a flow chart of a process for channel transmissions after a terminated CCA run, according to an exemplary embodiment.

Referring generally to FIGS. 37-39, processes for various activities related to performing a CCA, reserving a channel, and completing a transmission on the channel are described. Referring to FIG. 37, a flow 3700 of operations for transmitting data during a transmission window on a channel is shown, according to an exemplary embodiment. Flow 3700 includes determining a transmission window beginning at a first time (operation 3702). The transmission window is determined by, for example, a LAA-LTE AP configured to transmit data over an unlicensed LTE band. The transmission window is used to transmit data to one or more devices over a channel of the unlicensed LTE band.

Flow 3700 further includes determining whether the channel is available, at a second time prior to the first time (operation 3704). If the channel is available, flow 3700 may optionally include reserving the channel for transmission (operation 3706). Flow 3700 then includes transmitting the data during the transmission window (operation 3708). The data is transmitted during the transmission window between the first time and an end of the duration (e.g., the duration L as described above).

Flow 3700 may optionally include determining whether a remaining time within the transmission window after transmission of the data is complete exceeds a threshold (operation 3710). For example, after transmission for a given duration, there may be remaining time in the transmission window. Operation 3710 may include determining if more than a threshold time is left in the window. If so, flow 3700 includes cancelling reservation of the remaining time of the transmission window (operation 3712).

Referring to FIG. 38, a flow chart of a flow 3800 of operations for determining whether to reserve a channel is shown, according to an exemplary embodiment. Flow 3800 includes determining a timeframe between a time at which a channel assessment is completed and a time indicating the beginning of the transmission window (operation 3802). For example, operation 3802 may include a CCA run and determining a channel for future transmission at a first time.

Flow 3800 further includes determining whether to reserve the channel (operation 3804). For example, if the timeframe determined at operation 3802 exceeds a threshold timeframe, the LAA-LTE AP may have enough time to reserve the channel. As another example, if the timeframe determined at operation 3802 is less than the threshold timeframe, the LAA-LTE AP may not reserve the channel. In either event, flow 3800 may further include transmitting data on the channel (operation 3806).

Referring to FIG. 39, a flow chart of a process 3900 for channel transmissions after a terminated CCA run is shown, according to an exemplary embodiment. Process 3900 includes determining whether a CCA run will be completed in time (operation 3902). For example, as described above, a LAA-LTE AP may run a CCA in order to determine a channel for future communications. In some embodiments, a CCA run may not be able to be completed before start of a transmission window at a first time. Operation 3902 may include determining that the CCA run will not be complete before the first time.

In one embodiment, process 3900 may proceed by proceeding with a transmission on the channel (operation 3904). The transmission occurs without reservation of the channel, and starts at the first time (e.g., at the start of the transmission window). In one embodiment, process 3900 may proceed by waiting for the CCA to complete (operation 3906) and then transmitting data within the transmission window beginning at a third time (operation 3910). The third time is a time after the first time. Process 3900 may also optionally include reserving the channel for transmission (operation 3908) before transmitting the data at operation 3910. In one embodiment, process 3900 may include skipping the transmission window (operation 3912). Transmission may then be attempted by the LAA-LTE AP in a subsequent transmission window (operation 3914).

Unlicensed channels may be used by the small cell for communications as described above. A mix of LAA-LTE and WiFi APs share the unlicensed channels. The use of the unlicensed channels changes from one deployment location to another, and changes over time for a given deployment location. Therefore, the mix of the LAA-LTE and WiFi AP traffic on the shared channels changes accordingly.

Figure 40:
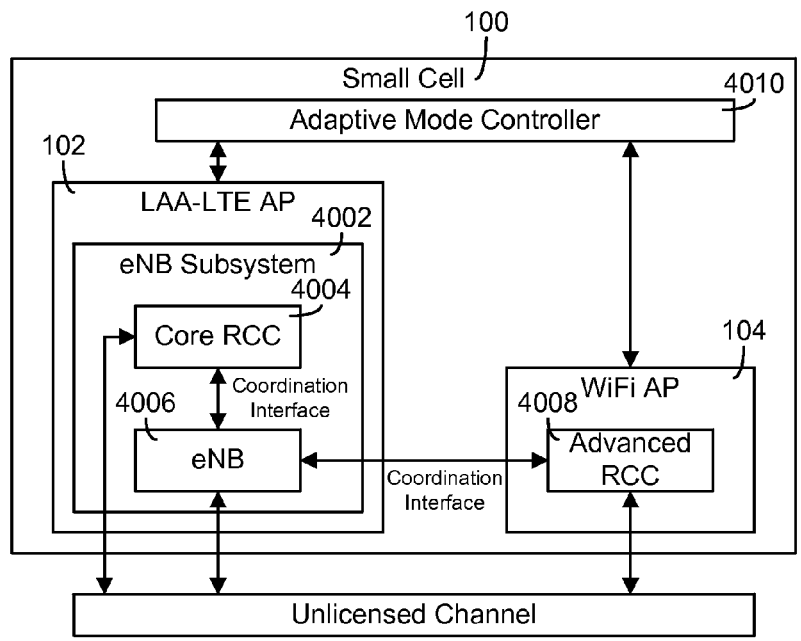
FIG. 40 is another more detailed block diagram of the small cell design of FIG. 1 according to an exemplary embodiment.
Figure 41:
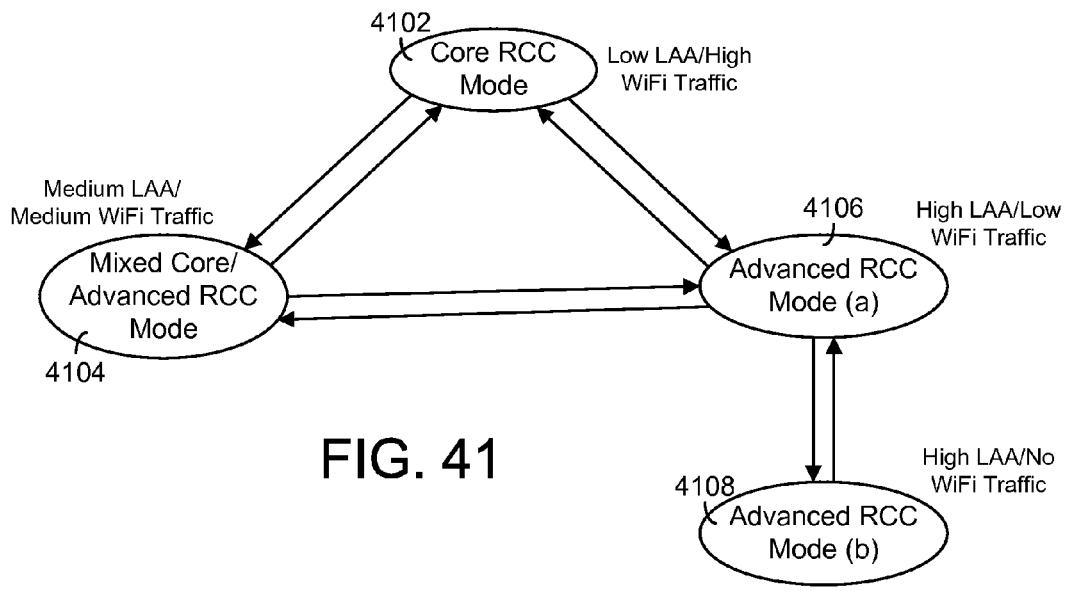
FIG. 41 illustrates an adaptive mode switching process of the small cell according to an exemplary embodiment.

Referring generally to FIGS. 40-41, adaptive mode switching for the small cell is described in greater detail. Adaptive mode switching is used to configure the small cell into one of multiple operating modes and to dynamically switch among the operating modes to adapt to dynamic changes in the traffic mix on a given unlicensed channel.

Referring now to FIG. 40, a block diagram of a small cell 100 is shown, according to an exemplary embodiment. For the purposes of simplicity, only components related to adaptive mode switching are illustrated in FIG. 40; the components shown may be integrated with the components shown in the small cell illustrated in FIG. 2.

Small cell 100 includes the LAA-LTE AP 102 including a LAA Evolved Node B (hereafter abbreviated eNB) subsystem 4002. eNB subsystem 4002 includes an integrated core RCC 4004 and eNB 4006. Core RCC 4004 implements a subset of WiFi AP functions that gain channel access for LAA-LTE AP 102. For instance, core RCC 4004 implements a CCA and channel reservation function as described in FIGS. 28-39. Further, core RCC 4004 supports an external WiFi AP 104, which includes an advanced RCC 4008 and provides full-featured coordination support for LAA-LTE AP 102. Advanced RCC 4008 supports functionality relating to coordinating access to an unlicensed channel. For example, advanced RCC 4008 may support NAV detection, QoS control, beacon message detection and decoding, etc. Both core RCC 4004 and advanced RCC 4008 are responsible for coordinating transmissions from LAA-LTE AP 102 on an unlicensed channel shared with other WiFi nodes.

Small cell 100 further includes adaptive mode controller 4010 configured to switch operating modes of small cell 100. For example, adaptive mode controller 4010 switches the operation mode between a core RCC mode, an advanced RCC mode, and a mixed core/advanced RCC mode. In the core RCC mode, transmissions are coordinated by core RCC 4004 only. The advanced CCA functionality of WiFi AP 104 is not activated. In the core RCC mode, WiFi AP 104 provides normal BSS support to WiFi clients on an unlicensed channel that may be different from the channel used for LAA-LTE AP 102 transmissions. In this mode, the WiFi nodes are better served since WiFi AP 104 is dedicated to the BSS and is not loaded with RCC tasks. Furthermore, WiFi AP 104 selects a WiFi channel that is not shared with LAA-LTE AP 102.

In the advanced RCC mode, transmissions are coordinated by WiFi AP 104 only, with core RCC 4004 disabled. LAA-LTE AP 102 is better served, since WiFi AP 104 provides full-featured coordination support for transmissions. In various embodiments, there are two variants of this mode. In one embodiment, besides operating advanced RCC 4008, WiFi AP 104 also provides its own BSS supports to the WiFi clients on the same channel as LAA-LTE AP 102. In another embodiment, WiFi AP 104 is dedicated to operate advanced RCC 4008 and does not provide its own BSS support to WiFi clients.

In the mixed core/advanced RCC mode, transmissions are coordinated jointly by integrated core RCC 4004 and advanced RCC 4008. For example, in one example joint coordination scheme, core RCC 4004 is responsible for CAA and channel reservation, while advanced RCC 4008 operates on the same channel as the LAA-LTE AP and is responsible for channel scanning, beacon detection and decoding, NAV detection, etc., on behalf of LAA eNB 4006. In another example joint coordination scheme, core RCC 4004 is responsible for CCA and channel reservation, while advanced RCC 4008 operates on a different channel from the LAA-LTE AP and is only responsible for providing eNB 4006 with channel information (e.g., scanning and beacon). In the mixed mode, the limited coordination function of core RCC 4004 is partially compensated by the coordination assistance from advanced RCC 4008. Such assistance is not full-featured and the WiFi AP dedicates most of its resources to support WiFi nodes. Therefore, in the mixed mode, the support for LAA-LTE nodes and WiFi nodes are balanced.

Referring now to FIG. 41, adaptive switching between the three modes is described in greater detail. The modes are switched according to current LAA-LTE and WiFi traffic composition on the shared channel. In one embodiment, adaptive mode controller 4010 determines the LAA-LTE/WiFi traffic composition of the channel by collecting information from eNB subsystem 4006 and WiFi AP 104. Such information may include the channel utilization by the LAA-LTE and WiFi APs, in terms of their percentages of time occupying the channel. Such information may further include total byte or packet counters for LAA and WiFi transmissions on the channel for a configurable time period (e.g., 10 minutes). Such information may further include the total number of currently active LAA-LTE and WiFi clients on the channel.

In one embodiment, adaptive mode controller 4010 uses the information to derive a traffic composition index value. For example, the traffic composition index may include the following values (assuming that LAA-LTE is always on): low LAA/high WiFi (mode 4102), medium LAA/medium WiFi (mode 4104), high LAA/low WiFi (mode 4106), and high LAA/no WiFi (mode 4108). In other embodiments, other values may be used to represent the current traffic composition on a channel. Adaptive mode controller 4010 periodically updates the traffic composition index value to reflect the dynamic nature of the traffic composition. In various embodiments, the period of the updating is fixed, configured, or dynamically adjusted.

In one embodiment, the "low" or "high" rating for LAA-LTE and WiFi traffic is determined relative to the total traffic on the channel. For example, if WiFi traffic on the channel exceeds LAA-LTE traffic on the channel by at least a threshold value, the low LAA/high WiFi mode is selected. As another example, if LAA-LTE traffic on the channel exceeds WiFi traffic on the channel by at least a threshold value, the high LAA/low WiFi mode is selected. As yet another example, if LAA-LTE traffic is within a threshold value of the WiFi traffic, the medium LAA/medium WiFi mode is selected. In another embodiment, certain "low" and "high" thresholds are set for LAA-LTE and WiFi traffic.

Adaptive mode controller 4010 switches small cell 100 operating modes according to the updated traffic composition index. In one embodiment, small cell 100 switches to the advanced RCC mode if it determines that no WiFi traffic has been detected for a certain period of time. This allows small cell 100 to disable some functions not involved with the RCC functionality, reducing unnecessary power consumption.

Figure 42:
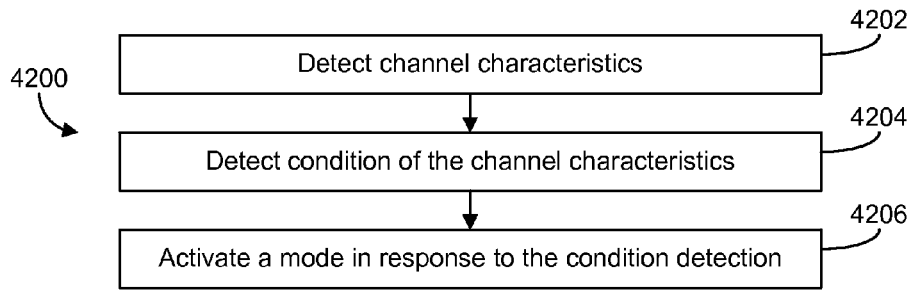
FIG. 42 is a flow chart of an adaptive mode switching process, according to an exemplary embodiment.

Referring now to FIG. 42, a flow chart of an adaptive mode switching flow 4200 of operations is shown, according to an exemplary embodiment. Flow 4200 includes detecting channel characteristics of a channel of the unlicensed LTE band through which data is transmitted (operation 4202). The detection may be performed by the LAA-LTE AP configured to transmit the data over the unlicensed LTE band. In one embodiment, the channel characteristics may include LAA-LTE traffic and WiFi traffic on the channel.

Flow 4200 further includes detecting a condition of the channel characteristics (operation 4204). In one embodiment, referring also to FIG. 41, the condition of the channel characteristics may include determining and classifying the traffic on the channel. For example, a low LAA/high WiFi, high LAA/low WiFi, or medium LAA/medium WiFi condition may be determined. Process 4200 further includes activating a mode of the LAA-LTE AP in response to the condition detection (operation 4206), as described with reference to FIG. 41.

Referring now to FIGS. 43-46, an access scheme for the small cell as described in the present disclosure is described in greater detail. The access scheme allows the LAA-LTE AP to deal with coexistence of the WiFi AP on a given channel, and for fair usage of the unlicensed channel with the WiFi AP. The access scheme may use a filler signal to prevent a WiFi AP from transmitting on a unlicensed channel, allowing the LAA-LTE AP to reserve usage of the channel at a given time.

The access scheme for the small cell uses various classifications to determine how the LAA-LTE AP and WiFi AP share a particular channel. The classifications relates to LAA-LTE AP channel usage. For example, one such classification is the LAA burst period. The burst time for each LAA-LTE channel usage could be long or short. The burst time duration length is set with respect to HARQ (hybrid automatic repeat request) re-transmission time, which is a process for resending a transmission. For example, if each LAA burst is long (e.g., 100 ms), the LAA-LTE AP uses a LTE MAC protocol with minimal changes as the HARQ re-transmission for most bursts is functional. In addition, any penalty for using synchronized transmission time intervals (TTIs) is negligible. As another example, if each LAA burst is short (e.g., limited to 5-6 ms) in order to allow usage of the channel by the WiFi AP, there is a need to modify the HARQ procedure. In addition, the penalty associated with synchronized TTIs is increased.

Figure 43:
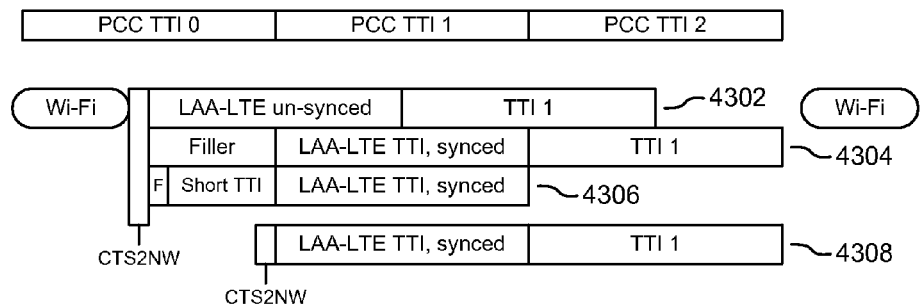
FIG. 43 is a schematic diagram of possible time synchronization schemes for the small cell according to an exemplary embodiment.

Another such classification of the access scheme is based on the TTI timing (e.g., the start time and length of a transmission block by the LAA-LTE AP). The TTI start time and TTI duration or length can be either fixed or set dynamically. Referring to FIG. 43, various different schemes related to different TTI start times and durations are shown, according to an exemplary embodiment.

In one embodiment, the TTI length is static (e.g., 1 ms). In another embodiment, the TTI length is dynamically selected from an allowed subset of lengths, according to channel occupancy.

In one embodiment, the TTI start time is aligned to a specific time grid. In this embodiment, the receiving node knows when each TTI starts. In another embodiment, the TTI start time relates directly to when the channel is reserved. Therefore, the synced TTI start time either reserves a channel only immediately prior to the burst start of a transmission (and is in disadvantage relative to a WiFi AP in high load) or reserves a channel whenever it is free (and "wastes" air resources). In one embodiment, the gap between the channel reservation and the first TTI start time is used to transmit additional data (e.g., a shorter TTI). In order to reduce the probability that the WiFi AP will start transmitting during this gap, filler signals are transmitted.

Referring more specifically to FIG. 43, a schematic view of four possible access schemes are illustrated. In scheme 4302, an unsynchronized TTI start is used with constant timing. In some implementations, the un-synced LAA-LTE transmission begins after the CTS2NW message and is followed by TTI 1. In some implementations, the un-synced LAA-LTE transmission begins after another detection that the channel is free. In scheme 4304, a static TTI length and start time is used. The reservation for the channel is made as soon as the channel is free (at PCC TTI 1), and the gap before that time is filled by a filler signal including non-data symbols (e.g., pilots and synchronization signals) and pseudo-noise. In scheme 4306, a synchronized TTI start time is used. A short TTI that starts at one point from a possible point subset is used to fill most of the gap before the start of transmission, and a filler signal is used for the remaining gap. In scheme 4308, a static TTI length and start time is used, with no filler in the gap. A CTS2NW message is sent just prior to PCC TT1, followed by the start of the transmission at PCC TTI 1.

Another such classification of the access scheme is based on frequency hopping or static frequency occupancy. Frequency hopping is used to allow the LAA-LTE cell to have a high duty cycle in the unlicensed spectrum when each frequency used has a low duty cycle.

There are several issues for frequency hopping addressed by the access scheme. In one embodiment, the frequency hopping includes an interrupt time large enough for receiver device (and possibly small cell) RF stabilization. The hopping definition requires signaling. Several LAA-LTE nodes could share the same hopping sequence with a different offset, which can eliminate interference within the nodes. Measurements (e.g., mobility and idle mode) may require modifications. The selected frequency subset and burst time per frequency is dynamically selected and modified. The selection criteria for the frequency subset and burst time includes: channel occupancy and load by existing systems, and LAA-LTE data load. For example, cells with low combined data can use only a subset of the frequency subset, in order to reduce total power. The LAA could benefit from using more of the channel than each entity support at a lower rate. For example, a node that supports two carries hopping over eight carriers can, under low load, use each carrier less than 25% of the time; which means the channel resources will be used nearly 100% of the time. A single LAA-LTE AP may have the same effect on single carrier as a WiFi node but a much higher impact on the overall unlicensed spectrum.

Figure 44:
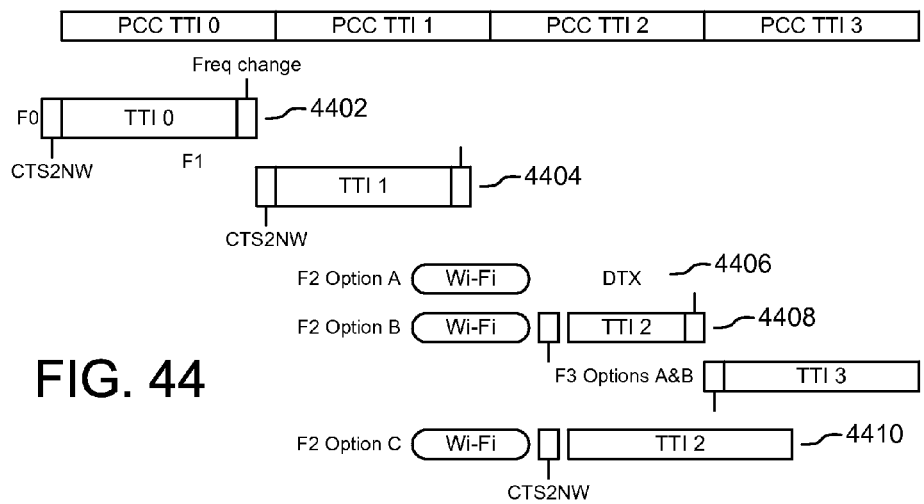
FIG. 44 is a schematic diagram of frequency hopping for the small cell according to an exemplary embodiment.

Referring to FIG. 44, a schematic view of frequency hopping is illustrated. Each frequency could be used for multiple TTIs (in the example shown in FIG. 39, a single TTI is presented). In one embodiment, the scheme includes usage of filler symbols as described in FIG. 43.

Following the use of a frequency (operation 4402), the LAA-LTE AP tries to use the channel in frequency F1 (operation 4404). In one embodiment, the channel is reserved. In another embodiment, the channel reservation is optional and the process of FIG. 44 continues. Following the channel occupancy detection and the optional reservation, the LAA-LTE AP continues normal transmission. Assuming when the next frequency is used, the LAA-LTE AP can use different approaches, as described below.

In one option, the LAA-LTE AP does not transmit anything during the nominal burst time and jumps to the next frequency at the nominal time (operation 4406). In another option a shorter burst is used, e.g., by having a shorter TTI or a lower number of TTIs (operation 4408). In another option, a nominal burst length is transmitted at offset (operation 4410).

Figure 45:
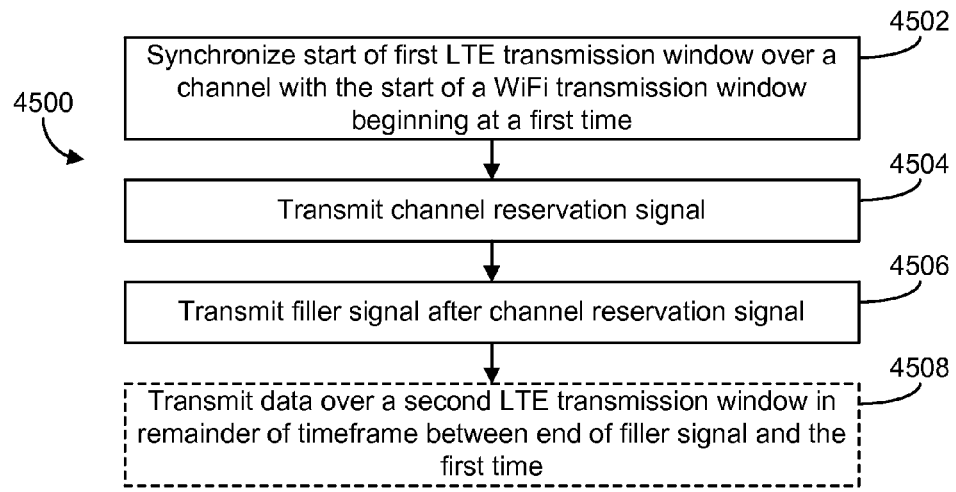
FIGS. 45-46 are flow charts of access scheme processes for the LAA-LTE access point according to an exemplary embodiment.

Referring now to FIG. 45, an access scheme flow 4500 of operations is shown, according to an exemplary embodiment. Flow 4500 includes synchronizing a start of a first LTE transmission window over a channel with the start of a WiFi transmission window (operation 4502). The LTE transmission window is used to transmit LTE data to one or more devices over a channel of the unlicensed LTE band. The LTE transmission window is synchronized with a WiFi transmission window belonging to a WiFi AP, beginning at a first time. The synchronizing may be done by the LAA-LTE AP.

Flow 4500 further includes transmitting a channel reservation signal (operation 4504). The channel reservation signal may be transmitted by the LAA-LTE AP at a second time before the first time. The channel reservation signal reserves the channel for transmission, starting at the first time. In some embodiments, the transmission of a filler signal (described in operation 4506) before a transmission is used as the channel reservation signal, and operation 4504 is skipped.

Flow 4500 further includes transmitting a filler signal after the channel reservation signal (operation 4506). The filler signal is transmitted by the LAA-LTE AP. The filler signal is configured to prevent one or more devices (e.g., WiFi devices, LAA-LTE devices) from transmitting on the channel before transmission by the LAA-LTE AP. The filler signal is transmitted for at least a portion of a timeframe between an end of transmission of the channel reservation signal and the first time. In one embodiment, the filler signal is transmitted for the whole timeframe. In another embodiment, the filler signal is transmitted for a portion of the timeframe. If so, flow 4500 then includes transmitting data over a second LTE transmission window in a remainder of the timeframe between an end of the filler signal and the first time (operation 4508). The second LTE transmission window is shorter than the first LTE transmission window.

Figure 46:
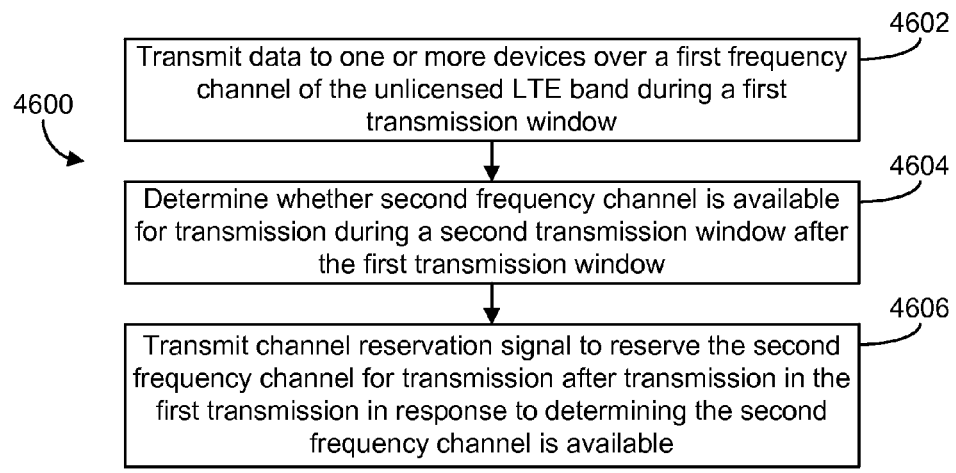

Referring now to FIG. 46, an access scheme flow 4600 is shown, according to another exemplary embodiment. Flow 4600 includes transmitting data to one or more devices over a first frequency channel of the unlicensed LTE band during a first transmission window (operation 4602). Flow 4600 further includes determining whether a second frequency channel is available for transmission by the LAA-LTE AP during a second transmission window after the first transmission window (operation 4604). Flow 4600 further includes transmitting a channel reservation signal configured to reserve the second frequency channel for transmission after transmission in the first transmission window in response to determining the second frequency channel is available (operation 4606).

In one embodiment, flow 4600 further includes determining whether a third frequency channel is available for transmission by the LAA-LTE AP during a third transmission window after the second transmission window in response to determining the second frequency channel is unavailable. In one embodiment, process 4600 further includes, in response to determining the second frequency channel is unavailable, determining whether the second frequency channel becomes available after a beginning of the second transmission window, and transmitting data on the second frequency channel during a remaining portion of the second transmission window in response to determining the second frequency channel has become available.

In one embodiment, flow 4600 further includes determining at least one of a set of frequency channels over which to transmit data and a burst time per frequency. The determination is based on one or more of a number of devices transmitting data on the set of frequency channels, a total data load on the set of frequency channels, or an amount of data transmitted by the LTE access point and one or more other LTE access points on the set of frequency channels.

As generally described in the present disclosure, a LAA-LTE access point may transmit (e.g., broadcast) one or more messages in a way that prevents WiFi access points from interfering with the broadcast. The LAA-LTE AP may conduct any number of processes to select and reserve a channel for transmission, and to transmit messages to various nodes in a network to avoid interference with the transmission. In some embodiments, a clear channel assessment (CCA) is run by the LAA-LTE access point to determine if the channel is clear for transmission.

In some embodiments, after running a CCA and determining that a channel is ready for transmission, the LAA-LTE AP may precede the transmission with a preamble sequence and/or reservation frame. The preamble sequence provides enhanced timing by including a sequence of data (e.g., 0s and 1s) that allow the nodes and WiFi APs receiving the preamble sequence to synchronize its clock with the clock of the LAA-LTE AP. The reservation frame may be used to help hold the channel until the end of a sub-frame in the channel, allowing for enhanced channel reservation features.

Figure 47:
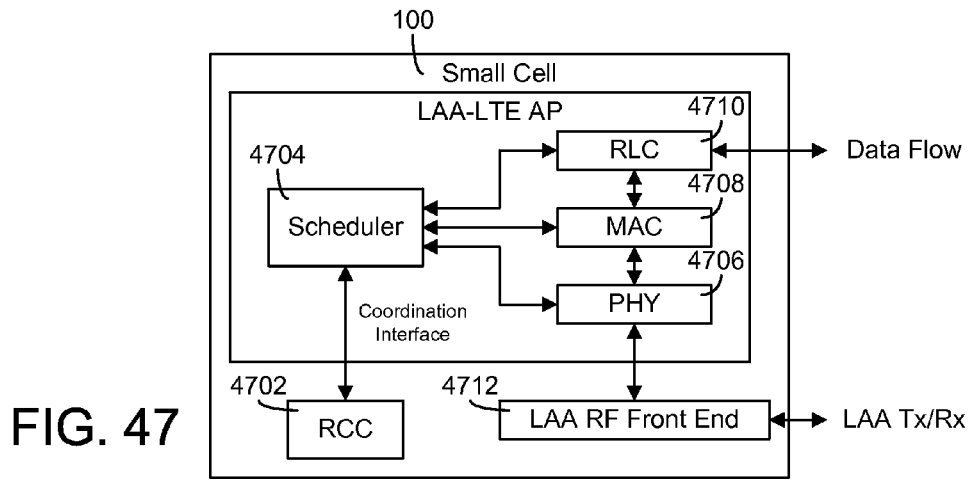
FIG. 47 is a detailed block diagram of the small cell design of FIG. 1 according to an exemplary embodiment.

Referring generally to FIG. 47, a block diagram of a small cell 100 is shown, according to an exemplary embodiment. For the purposes of simplicity, only components related to preamble sequence and channel reservation are illustrated in FIG. 47; the components shown may be integrated with the components shown in the small cell illustrated in FIG. 2.

Small cell 100 is shown to include a RCC 4702, which may serve as the WiFi coordinator 104 or WiFi AP 104 as described in the present disclosure. RCC 4702 may generally coordinate transmissions on the unlicensed band for the LAA-LTE AP as described above. Small cell 100 further includes LAA-LTE AP 102 including a scheduler 4704. Scheduler 4704 may be similar to scheduler 120. LAA-LTE AP 102 includes a PHY (physical layer) layer 4706 and MAC (media access control) layer 4708 as described above as well. The circuitry of PHY layer 4706 is coupled to the circuitry of RF front end 4712, which is coupled to the Tx/Rx antenna. LAA-LTE AP 102 further includes a radio link protocol (RLP) layer 4710 configured to provide a protocol for wireless communications on the unlicensed band. RLP layer 4710 is configured to detect packet losses during transmission and to cause retransmit of the packets to reduce packet loss.

Scheduler 4704 may be configured to calculate a downlink transmission window size. When data is ready for transmission by LAA-LTE AP 102, scheduler 4704 may calculate a window size during which the data is to be transmitted. The window size is configured to be compatible with the transmitting opportunities typically available on the channel. In one embodiment, the window size is calculated as a multiple of a LAA timeslot. For example, if a timeslot is 0.5 ms long, the window size is calculated as a multiple of 0.5 ms (i.e., N×0.5 ms).

Scheduler 4704 further controls PHY layer 4706 and RCC 4702 to perform the CCA (clear channel assessment). In particular, RCC 4702 may be configured to use measurements from PHY layer 4706 to detect channel activity to determine if the channel is clear for transmissions. PHY layer 4706 may be configured to measure activity in the channel, and RCC 4702 receives the measurements and performs energy detection and reservation frame/preamble detection. The detected energy levels are compared to a threshold, and if the energy levels are above the threshold, the channel may be determined to be busy. Similarly, RCC 4702 may detect a preamble sequence transmitted on the channel and determine the channel is busy in response to detecting the preamble sequence (from another node on the channel).

If the CCA is completed and determines that the channel is clear, RCC 4702 may inform scheduler 4704 to transmit a preamble sequence and channel reservation. In one embodiment, PHY layer 4706 facilitates the transmission of the preamble sequence and channel reservation based on an input from scheduler 4704. The channel reservation is used to reserve the channel for transmission for a transmission window. The preamble sequence is used to synchronize the other nodes on the channel with small cell 100. After reserving the channel, LAA-LTE AP 102 may then begin transmission at the start of the transmission window.

In one embodiment, the UEs receiving the transmissions (the user equipment) do not perform any CCA or channel reservation (i.e., the UEs do not have a RCC module). Functionally, the UEs may only be configured to receive transmissions (and not transmit itself). The UEs may use reservation frame and preamble sequence detection to detect when small cell 100 transmits the preamble sequence and channel reservation. This may enhance the performance of the PHY layer of the UEs.

In one embodiment, scheduler 4704 may use cross-carrier scheduling or unlicensed-carrier scheduling in the transmissions to the UEs. In cross-carrier scheduling, the UEs may be enabled to connect to different nodes to receive information on different carriers, to eliminate or reduce inter-cell interference on the channel.

Figure 48:
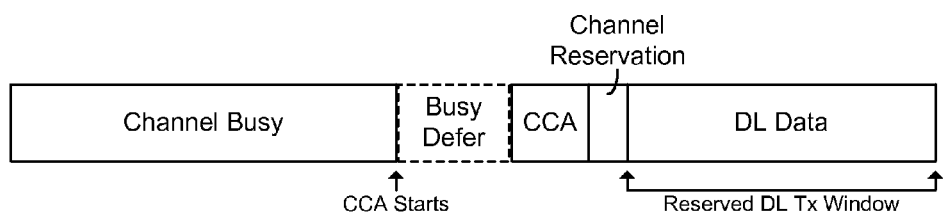
FIG. 48 illustrates a clear channel assessment and channel reservation process for a busy channel according to an exemplary embodiment.

Referring now to FIG. 48, a CCA and channel reservation process is shown in greater detail, according to an exemplary embodiment. In the example of FIG. 48, the channel may be busy (e.g., other devices are transmitting on the channel). Scheduler 4704 may begin the CCA by first deferring while the channel is busy. Once the channel is no longer busy, the CCA may be run. The CCA may include an additional deferring of a period of time (described in greater detail in FIGS. 49-50). The preamble sequence and reservation frame may be transmitted right after the CCA is run (assuming the channel is ready for transmission from the LAA-LTE AP), and data is then transmitted during the reserved downlink transmit window.

Figure 49:
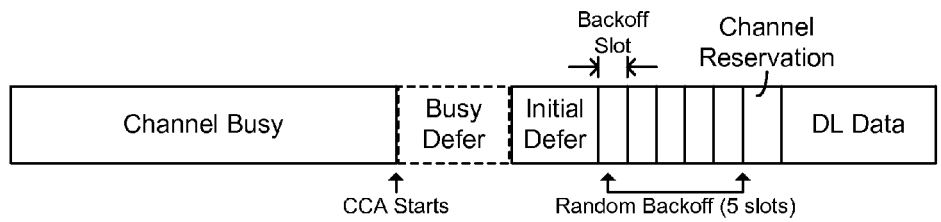
FIG. 49 illustrates the clear channel assessment and channel reservation process of FIG. 48 including a plurality of backoff slots according to an exemplary embodiment.
Figure 50:
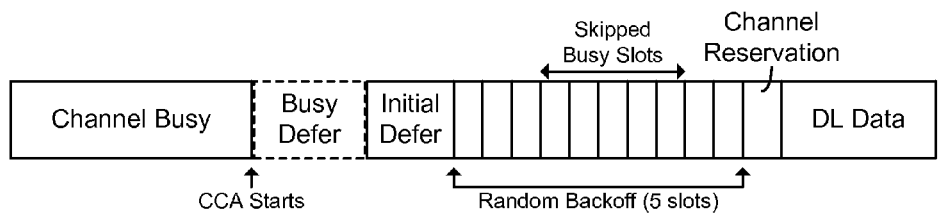
FIG. 50 illustrates the clear channel assessment and channel reservation process of FIG. 48 including a plurality of backoff slots and skipped busy slots according to an exemplary embodiment.

Referring also to FIGS. 49-50, the defer periods are described in greater detail. In one embodiment, as shown in FIG. 49, the CCA starts at a second time before the first time at which the actual transmission would start. The CCA starts with an busy defer time while the channel is busy (i.e., other nodes are transmitting on the channel). Once the channel is no longer busy, the CCA may continue with an additional initial defer time. The initial defer time may be a fixed period of time. In some embodiments, the initial defer time is configurable. For example, a default initial defer time (DIFS) of 34 μs may be set for a channel under the 802.11n/ac protocol.

After the initial defer time, the CCA may include a random number of backoff slots. For example, the CCA may generate a random number of backoff slots, the number between zero and a value anywhere from 32 to 256. The value may be chosen to be any value in between 32 and 256, in one embodiment. The value may be adapted based on the overall channel conditions. Each backoff slot may have a configurable size. For example, each backoff slot may last a default time of 9 μs for the 802.11n/ac protocol. In the embodiment of FIG. 49, five backoff slots are shown in which the CCA pauses. After the backoff slots, the channel reservation procedure is run, and then the data is transmitted by LAA-LTE AP 102.

Referring now to FIG. 50, in some embodiments, the channel may become busy during the defer times and backoff slots. For example, as shown in FIG. 50, the channel may become busy (i.e., a node is transmitting on the channel) during the random backoff. If the channel is busy during an individual backoff slot, the slot is skipped. Assuming that the random number of backoff slots to wait was determined to be five, the CCA may include waiting until five backoff slots are completed in which there were no transmissions. Backoff slots for which the channel was busy during the slot are not counted towards the five (i.e., the backoff slots are skipped).

Figure 51:
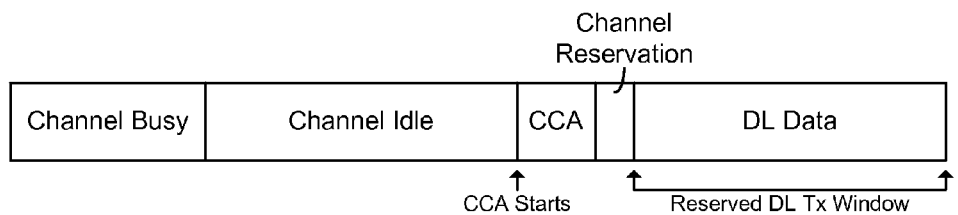
FIG. 51 illustrates a clear channel assessment and channel reservation process for an idle channel according to an exemplary embodiment.

Referring now to FIG. 51, a CCA and channel reservation process is shown in greater detail, according to another exemplary embodiment. In the example of FIG. 51, the channel may be idle (e.g., other devices are not transmitting on the channel) for a period of time and may be available for immediately reserving and transmitting at the time scheduler 4704 wishes to conduct a CCA. In one embodiment, the channel may be idle for more than a defer threshold (e.g., a period of time for which the channel has been idle) before the CCA starts. The CCA starts and completes by determining that the channel is available. The channel reservation and data transmission may then occur as described in the present disclosure.

Figure 52:
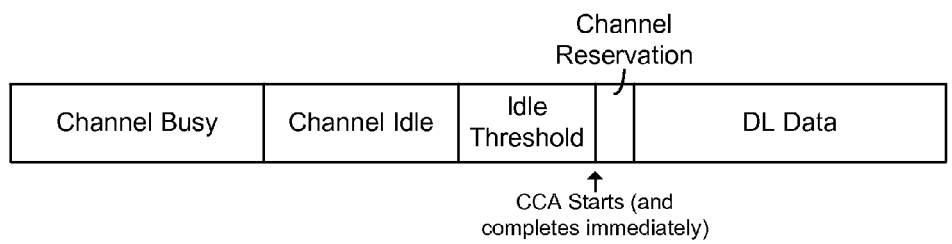
FIG. 52 illustrates the clear channel assessment and channel reservation process of FIG. 51 including an idle threshold according to an exemplary embodiment.

Referring also to FIG. 52, the activities during the CCA are shown in greater detail. Before the CCA is run, an idle threshold period may occur where scheduler 4704 pauses before running the CCA. The idle threshold period may be a configurable fixed period of time (e.g., 34 μs for a channel under the 802.11n/ac protocol).

Referring generally to FIGS. 53-59, the preamble sequence and reservation frame transmissions are described in greater detail. In one embodiment, the reservation frame transmissions are used to reserve the channel until the end of a downlink transmission window. In other words, the channel is reserved in order to complete a data transmission by the LAA-LTE AP. The channel reservation allows other nodes and devices on the channel to back off until the completion of the downlink transmission window. The preamble sequence and reservation frame may be used to reserve a channel for transmission, the transmission window configured to end at any timeslot boundary (i.e., the window size is configurable based on one or more timeslot boundaries set by the channel).

In some embodiments, LAA-LTE AP 102 may transmit one or both of the preamble sequence and reservation frame. The preamble sequence and reservation frame may be incorporated into an existing system for managing various telecommunication standards (e.g., 3GPP) or may be applied alone.

Figure 53:
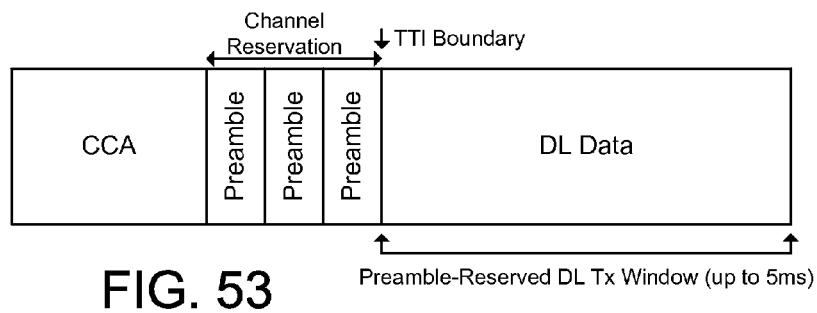
FIG. 53 illustrates a preamble sequence process according to an exemplary embodiment.

Referring to FIG. 53, an embodiment is shown where LAA-LTE AP 102 only transmits a preamble sequence before transmission of data in the transmission window. After the CCA is run, the channel reservation is run by transmitting a sequence of preambles before the start of the data transmission window. In one embodiment, the sequence of preambles is sent without first sending a reservation frame. In such an embodiment, the last preamble sequence may include a length field. The length field may define a length of transmission. The length may cover a period lasting to the field of the transmission window or cover a set period of time (e.g., 5 ms), whichever is shorter. The preamble sequence with the length field is received at the other nodes in the channel and used by the other nodes to back off from usage of the channel until the end of the transmission window and to perform its own preamble detection. Further, the nodes or UEs may perform channel estimation.

Figure 54:
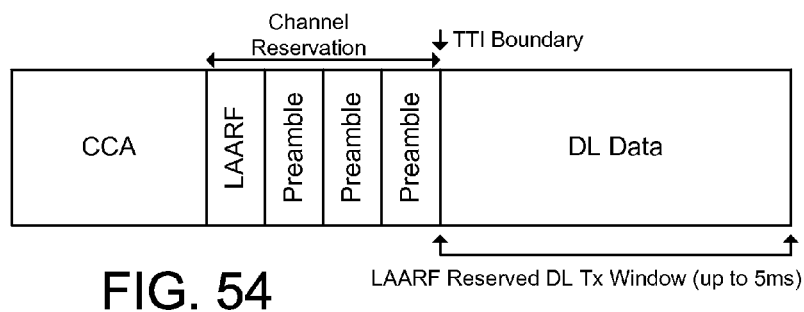
FIG. 54 illustrates a preamble sequence and channel reservation process according to an exemplary embodiment.

Referring to FIG. 54, in another embodiment, both a reservation frame and a preamble sequence are transmitted by LAA-LTE AP 102. The reservation frame (e.g., a LAA reservation frame, heretoafter abbreviated LAARF) may be transmitted immediately after completion of a CCA, according to one embodiment. The LAARF may include a preamble and a duration field. The duration field may define a length of time lasting until the end of the transmission window, indicating the length of the upcoming transmission by the LAA-LTE AP. The other nodes and UEs on the channel may receive the reservation frame and use the duration field to back off from channel activity until the end of the transmission window. In the embodiment of FIG. 54, the length of the transmission window is sent via the reservation frame instead of the last preamble sequence.

Figure 55:
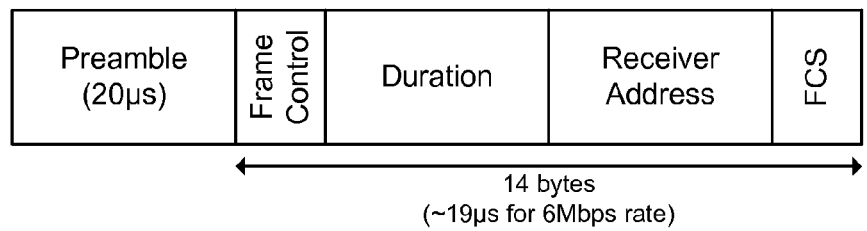
FIG. 55 illustrates an example CTS message including a preamble sequence according to an exemplary embodiment.

Referring now to FIG. 55, an example CTS-to-self message is illustrated including a preamble sequence. As generally described in the present disclosure, a CTS message is sent by the LAA-LTE AP to help clear the channel for transmission. Referring more particularly to FIGS. 47-59, the preamble sequence may be transmitted via CTS messages. The CTS-to-self message illustrated in FIG. 55 is provided by way of example only; in other embodiments, any type of CTS message (e.g., CTS2NW, etc.) may be used for transmission of the preamble sequences. The CTS-to-self message generally includes the preamble, a frame control field, a duration field (e.g., the duration to the end of the transmission window, as described above), a receiver address field, and a FCS field (e.g., a frame check sequence field or other field used to verify that the message is not corrupted). The duration field may be set to a maximum range of 32 ms, according to one embodiment. The receiver address field may be set to the transmitter address, according to one embodiment.

Figure 56:
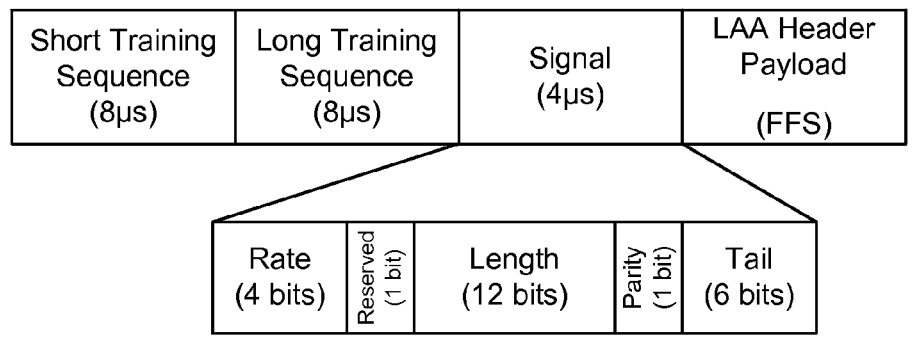
FIG. 56 illustrates the preamble sequence of FIG. 55 in greater detail according to an exemplary embodiment.

Referring to FIG. 56, the preamble sequence of the CTS-to-self message is shown in greater detail. The preamble sequence includes a short training sequence field, long training sequence field, signal, and LAA header payload. The short training sequence field is used for signal detection by the other nodes in the channel, for AGC diversity selection, for timing synchronization (to synchronize the other nodes with the LAA-LTE AP), and for coarse frequency offset estimation. The long training sequence field is used for channel estimation, channel equalization, and fine frequency offset estimation. In one embodiment, the short training sequence field and long training sequence field may combine to form the PLCP preamble as described above, with the signal field being part of the PLCP header.

The signal is shown in greater detail in FIG. 56. The signal includes a rate subfield (4 bits) which indicates the data rate for the payload. The signal includes a reserved subfield and a length subfield covering up to 5.46 ms of the payload. The signal include a parity bit and a tail subfield. The signal includes a OFDM (orthogonal frequency-division multiplexing) symbol (BPSK, ½ rate). The LAA header payload may be an optional field to carry a LAA reference signal.

Figure 57:
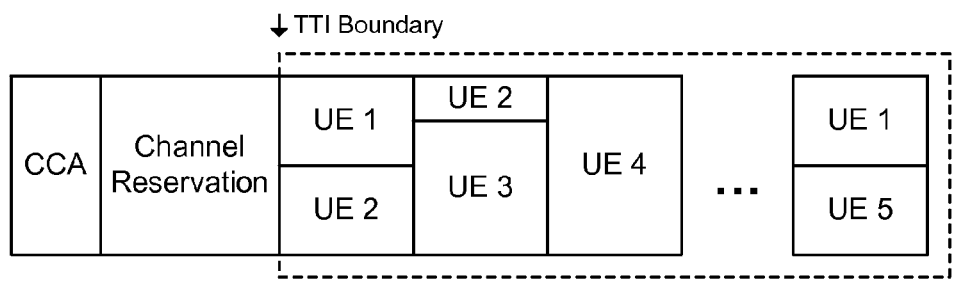
FIG. 57 illustrates a scheme a clear channel assessment scheme for multiple nodes according to an exemplary embodiment.

Referring to FIG. 57, a CCA scheme for multiple nodes on a channel is shown, according to an exemplary embodiment. Multiple user equipment (nodes) may share a downlink data window in a standard LTE multi-user access scheme, in one or more embodiments. In the embodiment of FIG. 57, multiple UEs are shown sharing the channel during the transmission window. Throughout the transmission window, a UE may share the window with one or more other UEs, or may not share (e.g., UE 4). The UEs and/or access points may be configured to facilitate sharing of the channel during the transmission window.

Figure 58:
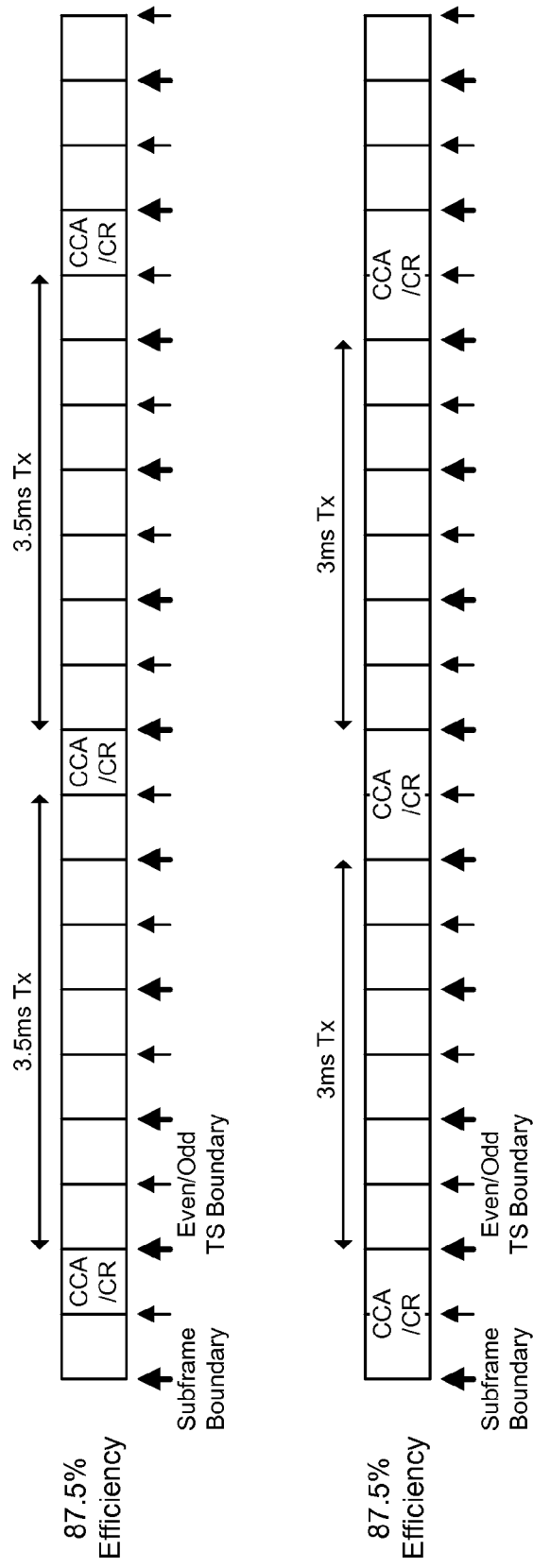
FIG. 58 illustrates different transmission windows that may be reserved by the channel reservation process according to an exemplary embodiment.

Referring now to FIG. 58, different transmission windows that may be reserved by the channel reservation process is shown. The CCA and channel reservation process is compatible with WLAN as described in the present disclosure. Further, the process allows for retaining a high bandwidth efficiency even in systems which stipulate a small maximum transmission window. For example, since the transmission window can end at any LAA timeslot boundary, back-to-back LAA transmissions in some systems can be significantly improved compared to cases where the transmission window ends at a subframe boundary. For example, in some countries (e.g., Japan), a small maximum transmission window may be stipulated, such as 4 ms. The systems and methods herein allow for a smaller transmission window (e.g., 3.5 ms or 3 ms). FIG. 58 illustrates two scenarios in which a 3.5 ms window and a 3 ms window are used, respectively. The channel reservation may run for 0.5 ms and 1 ms, respectively, resulting in a high efficiency (87.5% and 75%, respectively).

Figure 59:
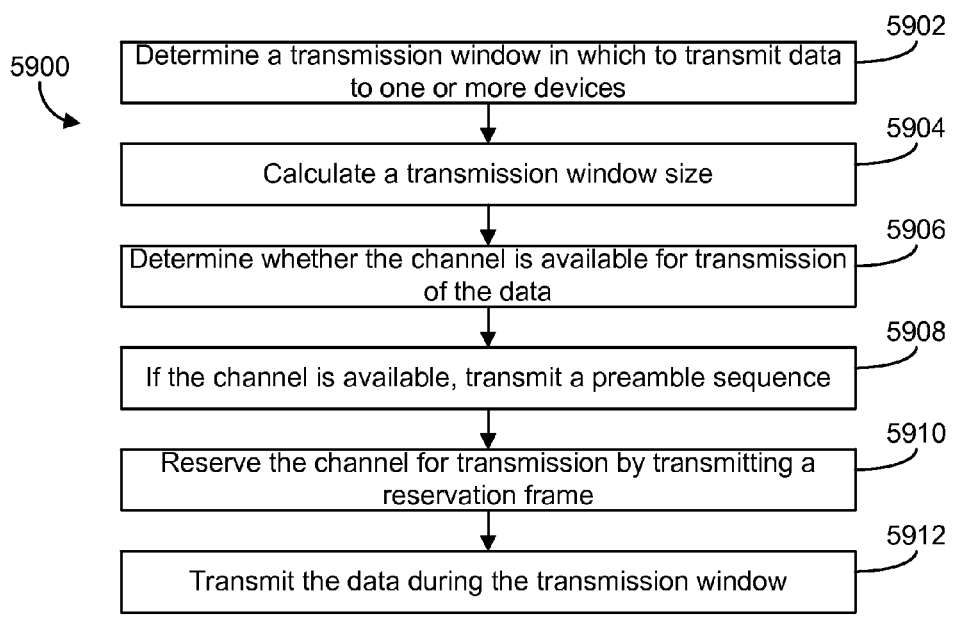
FIG. 59 is a flow chart of a channel reservation process according to an exemplary embodiment.

Referring to FIG. 59, a flow 5900 of operations for a channel reservation process is shown according to an exemplary embodiment. Flow 5900 includes determining a transmission window in which to transmit data to one or more devices (operation 5902). The transmission window is set to begin at a first time. The transmission window is determined by, for example, a LAA-LTE AP configured to transmit data over an unlicensed LTE band. The transmission window is used to transmit data to one or more devices over a channel of the unlicensed band.

Flow 5900 further includes calculating a transmission window size (operation 5904). In one embodiment, the window size corresponds with one or more timeslots available for transmission in the channel. For example, the window may be calculated as a multiple of a LAA timeslot. If a timeslot is 0.5 ms long, the window size is calculated as a multiple of 0.5 ms (i.e., N×0.5 ms).

Flow 5900 further includes determining whether the channel is available for transmission of the data (operation 5906). In one embodiment, operation 5906 includes running a clear channel assessment at a second time before the first time, as described in the present disclosure. Operation 5906 may include, if the channel is currently busy, waiting for the channel to no longer be busy and then waiting an additional period of time (a busy defer time) before running the CCA. Operation 5906 may include, if the channel is currently idle, waiting an additional period of time (an initial defer time period) before running the CCA. Further, operation 5906 may include waiting a number of backoff slots before running the CCA. The backoff slots are used to wait to see if other nodes attempt to use the channel. This may avoid an attempt to reserve the channel while other nodes attempt to use the channel.

Flow 5900 further includes, if the channel is available, transmitting a preamble sequence (operation 5908). The preamble sequence synchronizes the access point with the one or more nodes on the channel. Flow 5900 further includes reserving the channel for transmission by transmitting a reservation frame (operation 5910). In one embodiment, one of the preamble sequence and reservation frame includes a length field that indicates the length of the transmission window to other nodes on the channel (to notify the other nodes of the length of the upcoming transmission). Flow 5900 further includes transmitting the data during the transmission window (operation 5912), at a time between the first time and the end of the transmission window.

Various exemplary embodiments related to transmissions over unlicensed LTE channels are provided. In various embodiments, WiFi and LTE access points may be integrated within a single device or provided as separate devices.

In some embodiments, a scheduler of the WiFi access point is configured to aggregate multiple packets of data for transmission during a single transmission window after the one or more messages are broadcast that are configured to prevent the WiFi nodes from transmitting on a selected channel. In some embodiments, the one or more messages are broadcast based on a request cycle, and the scheduler is configured to determine whether to trigger a broadcast based on the packets of data currently available for transmission. In some embodiments, the messages are broadcast at intervals, and the intervals are adjusted based on the activity on the channel.

In some embodiments, the WiFi access point may provide an indication to the LTE access point when the channel is ready for transmission.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable storage media for accomplishing its operations. The embodiments of the present disclosure may be implemented using an existing computer processor, or by a special purpose computer processor incorporated for this or another purpose. No claim element herein is to be construed as a "means plus function" element unless the element is expressly recited using the phrase "means for." Furthermore, no element, component or method operation in the present disclosure is intended to be dedicated to the public, regardless of whether the element, component or method operation is explicitly recited in the claims.

Embodiments within the scope of the present disclosure include machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method operations which may be implemented in one embodiment by a program product including machine-executable instructions, such as program code, for example, in the form of program modules executed by machines in networked environments.

It should be noted that although the flowcharts provided herein show a specific order of method steps, it is understood that the order of these operations may differ from what is depicted. Also two or more steps may be performed concurrently or with partial concurrence. Such variation will depend on the software and hardware systems chosen and on designer choice. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method, comprising:
    determining, by a WiFi access point of a small cell, channel use data indicating traffic on a plurality of channels of an unlicensed Long Term Evolution (LTE) band in a wireless network;
    transmitting, by the WiFi access point, the channel use data to a LTE access point of the small cell;
    receiving, at the LTE access point, the channel use data from the WiFi access point;
    selecting, using the LTE access point, a channel for use in transmitting data by the LTE access point from among the plurality of channels using the received channel use data from the WiFi access point;
    at a second time prior to a first time, determining, by the WiFi access point, whether the channel is available for the LTE access point to transmit the data for a duration after the first time;

in response to determining the channel is available, reserving, by the WiFi access point, the channel for transmission for the duration after the first time; and transmitting, by the LTE access point, the data during a transmission window between the first time and an end of the duration; and providing, from the LTE access point to the WiFi access point, an indication of an upcoming transmission on the selected channel of the unlicensed LTE band.

2. The method of claim 1, the step of selecting the channel comprising selecting a first channel for which the channel use data indicates a lower level of traffic than one or more second channels reflected in the channel use data.

3. The method of claim 1, further comprising broadcasting one or more messages from the WiFi access point to one or more WiFi nodes, the one or more messages configured to prevent the WiFi nodes from transmitting on the channel.

4. The method of claim 3, wherein the indication of an upcoming transmission comprises the duration, and wherein the one or more messages comprise one or more clear-to-send messages configured to prevent the WiFi nodes from transmitting on the channel for at least the transmission duration.

5. The method of claim 4, wherein a first message of the one or more messages is directed to a recipient node of the transmission, and wherein the first message is configured to cause the recipient node to transmit a second message to one or more second WiFi nodes outside of a range of the WiFi access point configured to prevent the one or more second nodes from transmitting on the channel.

6. The method of claim 4, wherein the indication comprises a quality of service priority parameter for the transmission, and wherein the method further comprises, by the WiFi access point, adding a request associated with the indication to a queue with a plurality of other requests, each having one of a plurality of quality of service priority parameters, and prioritizing use of the channels among the request and the plurality of other requests using the plurality of quality of service priority parameters.

7. A method comprising:
determining, at a Long Term Evolution (LTE) access point of a small cell configured to transmit data over an unlicensed LTE band, a first transmission window in which to transmit data to one or more devices over a channel of the unlicensed LTE band beginning at a first time, wherein the LTE access point shares the channel with a WiFi access point of the small cell, wherein the channel is selected by:
determining, by the WiFi access point, channel use data indicating traffic on a plurality of channels of the unlicensed LTE band;
transmitting, by the WiFi access point, the channel use data to the LTE access point;
receiving, at the LTE access point, the channel use data from the WiFi access point;
selecting, using the LTE access point, the channel using the received channel use data from the WiFi access point;
at a second time prior to the first time, determining, by the WiFi access point, whether the channel is available for the LTE access point to transmit the data for a duration after the first time based on a channel assessment;
in response to determining the channel is available, reserving, by the WiFi access point, the channel for transmission for the duration after the first time; and transmitting, by the LTE access point, the data during the first transmission window between the first time and an end of the duration.

8. The method of claim 7, further comprising:
determining whether a remaining time within the first transmission window after transmission of the data is complete exceeds a threshold; and
cancelling reservation of the remaining time of the first transmission window in response to determining that the remaining time exceeds the threshold.

9. The method of claim 7, further comprising:
determining a timeframe between a third time at which the channel assessment is completed and the first time; and
reserving the channel for transmission for the duration after the first time in response to determining the timeframe exceeds a threshold timeframe.

10. A method comprising:
determining, at a Long Term Evolution (LTE) access point configured to transmit data over an unlicensed LTE band, a first transmission window in which to transmit data to one or more devices over a channel of the unlicensed LTE band beginning at a first time;
at a second time prior to the first time, determining whether the channel is available for transmission of the data for a duration after the first time based on a channel assessment in response to determining the channel is available, reserving the channel for transmission for the duration after the first time;
determining a timeframe between a third time at which the channel assessment is completed and the first time; and
transmitting the data during the first transmission window between the first time and an end of the duration, wherein transmitting the data during the first transmission window comprises transmitting the data without reserving the channel for transmission in response to determining the timeframe is less than a threshold timeframe.

11. The method of claim 7, further comprising:
determining whether the channel assessment will be complete by the first time; and
if the channel assessment will not be complete by the first time:
proceeding with transmitting the data during the first transmission window starting at the first time regardless of whether the channel assessment is complete;
waiting for the channel assessment to complete, reserving the channel for transmission after completion of the channel assessment, and transmitting the data within the first transmission window beginning at a third time after the first time; or
skipping the first transmission window and attempting transmission of the data in a subsequent transmission window.

12. A method comprising:
determining, at a Long Term Evolution (LTE) access point configured to transmit data over an unlicensed LTE band, a first transmission window in which to transmit data to one or more devices over a channel of the unlicensed LTE band beginning at a first time;
at a second time prior to the first time, determining whether the channel is available for transmission of the data for a duration after the first time based on a channel assessment;

in response to determining the channel is available, reserving the channel for transmission for the duration after the first time; and
transmitting the data during the first transmission window between the first time and an end of the duration;
detecting channel characteristics of the channel;
activating a first mode of the LTE access point in which the LTE access point coordinates one or more LTE transmissions and one or more WiFi transmissions on the channel, the first mode activated in response to detecting a first condition of the channel characteristics;
activating a second mode of the LTE access point in which the LTE access point communicates with a WiFi access point and the WiFi access point coordinates the LTE transmissions and the WiFi transmissions on the channel, the second mode activated in response to detecting a second condition of the channel characteristics; and
activating, at the LTE access point, a third mode of the LTE access point in which the LTE access point and the WiFi access point each conduct a portion of the coordination of the LTE transmissions and the WiFi transmissions on the channel, the third mode activated in response to detecting a third condition of the channel characteristics.

13. The method of claim 12, wherein:
detecting the first condition of the channel characteristics comprises detecting WiFi traffic on the channel exceeds LTE traffic on the channel by at least a threshold value;
detecting the second condition of the channel characteristics comprises detecting LTE traffic on the channel exceeds WiFi traffic on the channel by at least a threshold value; and
detecting the third condition of the channel characteristics comprises detecting LTE traffic on the channel is within a threshold value of WiFi traffic on the channel.

14. The method of claim 7, further comprising:
synchronizing the start of the first transmission window with the start of a WiFi transmission window of a WiFi access point beginning at the first time;
transmitting, at the second time, a channel reservation signal configured to reserve the channel for transmission starting at the first time; and
transmitting a filler signal after the channel reservation signal configured to prevent one or more WiFi devices from transmitting on the channel before transmission by the LTE access point, the filler signal transmitted for at least a portion of a timeframe between an end of transmission of the channel reservation signal and the first time.

15. The method of claim 7, further comprising:
determining whether a second frequency channel is available for transmission by the LTE access point during a second transmission window after the first transmission window; and
in response to determining the second frequency channel is available, transmitting a channel reservation signal configured to reserve the second frequency channel for transmission after transmission in the first transmission window.

16. The method of claim 7, further comprising determining at least one of a set of frequency channels over which to transmit data and a burst time per frequency channel based on one or more of:
a number of devices transmitting data on the set of frequency channels;
a total data load on the set of frequency channels; or
an amount of data transmitted by the LTE access point and one or more other LTE access points on the set of frequency channels.

17. A method, comprising:
determining, at a Long Term Evolution (LTE) access point of a small cell configured to transmit data over an unlicensed LTE band, a transmission window in which to transmit data to one or more devices over a channel of the unlicensed LTE band beginning at a first time, wherein the LTE access point shares the channel with a WiFi access point of the small cell, wherein the channel is selected by:
determining, by the WiFi access point, channel use data indicating traffic on a plurality of channels of the unlicensed LTE band;
transmitting, by the WiFi access point, the channel use data to the LTE access point;
receiving, at the LTE access point, the channel use data from the WiFi access point;
selecting, using the LTE access point, the channel using the received channel use data from the WiFi access point;
calculating, by the LTE access point, a transmission window size corresponding to one or more timeslots available for transmission in the channel;
at a second time prior to the first time, determining, by the WiFi access point, whether the channel is available for the LTE access point to transmit the data for a duration after the first time based on a channel assessment;
in response to determining the channel is available, informing, by the WiFi access point, the LTE access point to transmit a preamble sequence and reserve the channel;
transmitting, by the LTE access point, the preamble sequence to synchronize the LTE access point with one or more nodes;
reserving, by the LTE access point, the channel for transmission by transmitting a reservation frame, the length of the reservation of the channel based on the transmission window size; and
transmitting, by the LTE access point, the data during the transmission window between the first time and the end of a transmission window.

18. The method of claim 17, wherein the channel assessment comprises:
an energy detection process configured to detect interference in the channel, wherein the channel is declared as busy if the interference exceeds an energy detection threshold; and
a preamble and reservation frame detection process configured to detect a preamble sequence and/or reservation frame in the channel, wherein the channel is declared as busy if a preamble sequence and/or reservation frame is detected.

19. The method of claim 17, wherein the reservation frame comprises a duration field, the duration field indicating a period of time lasting until the end of the transmission window.

20. The method of claim 17, wherein a last preamble in the preamble sequence comprises a length field that indicates a period of time lasting until the end of the transmission window.

\* \* \* \* \*